(12) United States Patent
Sakai et al.

(10) Patent No.: US 11,056,079 B2
(45) Date of Patent: Jul. 6, 2021

(54) DISPLAY SYSTEM AND PROGRAM

(71) Applicant: EIZO Corporation, Hakusan (JP)

(72) Inventors: Yoshikazu Sakai, Hakusan (JP);
Akihiro Masatani, Hakusan (JP);
Shoya Higashi, Hakusan (JP)

(73) Assignee: EIZO Corporation, Hakusan (JP)

( * ) Notice: Subject to any disclaimer, the term of this patent is extended or adjusted under 35 U.S.C. 154(b) by 0 days.

(21) Appl. No.: 16/969,312

(22) PCT Filed: Feb. 14, 2018

(86) PCT No.: PCT/JP2018/005130
§ 371 (c)(1),
(2) Date: Aug. 12, 2020

(87) PCT Pub. No.: WO2019/159266
PCT Pub. Date: Aug. 22, 2019

(65) Prior Publication Data
US 2021/0049979 A1 Feb. 18, 2021

(51) Int. Cl.
*G09G 5/10* (2006.01)
*G06F 3/14* (2006.01)
*G09G 3/34* (2006.01)

(52) U.S. Cl.
CPC .............. *G09G 5/10* (2013.01); *G06F 3/1431* (2013.01); *G09G 3/3406* (2013.01);
(Continued)

(58) Field of Classification Search
CPC .................... G06F 3/1431; G09G 5/00; G09G 2340/0428; G09G 2320/0606;
(Continued)

(56) References Cited

U.S. PATENT DOCUMENTS

2005/0248508 A1* 11/2005 Seong .................. G09G 3/2077
345/63
2011/0175552 A1 7/2011 Kwon et al.
(Continued)

FOREIGN PATENT DOCUMENTS

JP 2004-206426 A 7/2004
JP 2014-517556 A 7/2014
(Continued)

OTHER PUBLICATIONS

International Search Report dated May 22, 2018 in corresponding application No. PCT/JP2018/005130; 2 pgs.

*Primary Examiner* — Abbas I Abdulselam
(74) *Attorney, Agent, or Firm* — Maier & Maier, PLLC

(57) ABSTRACT

The purpose of the present invention is to provide a display system capable of preventing a change in gradation characteristics from reducing the visibility of an image. The present invention provides a display system that includes a display unit and a display control unit, wherein: the display control unit includes a gradation characteristic converter; the gradation characteristic converter converts first gradation characteristics to second gradation characteristics; the first gradation characteristics maintain a constant level of the difference in the JND correspondence value between each gradation value; the gradation characteristic converter performs the conversion to maintain a constant level of the difference in JND correspondence value between each gradation value which is controlled by the second gradation characteristics; and the display unit displays input image data as an image at a luminance corresponding to the second gradation characteristics.

18 Claims, 31 Drawing Sheets

(52) U.S. Cl.
CPC ............ *G09G 2320/0271* (2013.01); *G09G 2320/0606* (2013.01); *G09G 2340/0428* (2013.01); *G09G 2354/00* (2013.01); *G09G 2360/04* (2013.01); *G09G 2380/08* (2013.01)

(58) Field of Classification Search
CPC ............ G09G 2380/08; G09G 3/3406; G09G 2360/04; G09G 2320/0271
See application file for complete search history.

(56) References Cited

U.S. PATENT DOCUMENTS

| | | |
|---|---|---|
| 2014/0029665 A1 | 1/2014 | Damkat et al. |
| 2015/0278442 A1 | 10/2015 | Rezaee |
| 2017/0221405 A1 | 8/2017 | Yoshida et al. |
| 2018/0322847 A1 | 11/2018 | Aoki et al. |

FOREIGN PATENT DOCUMENTS

| | | |
|---|---|---|
| WO | 2014162555 A1 | 10/2014 |
| WO | 2016013125 A1 | 1/2016 |
| WO | 2017085786 A1 | 5/2017 |

\* cited by examiner

| JND | LUMINANCE [cd/m$^2$] |
|---|---|
| 1 | 0.0500 |
| 2 | 0.0547 |
| 3 | 0.0594 |
| 4 | 0.0643 |
| ... | ... |
| 1021 | 3941.8580 |
| 1022 | 3967.5470 |
| 1023 | 3993.4040 |

FIG. 1

| P | L(j) | j | $\triangle j$ |
|---|---|---|---|
| 0 | 0.6 | 52.5 | |
| 1 | 0.65 | 55 | 2.56 |
| 2 | 0.7 | 57.6 | 2.56 |
| 3 | 0.75 | 60.2 | 2.56 |
| 4 | 0.8 | 62.7 | 2.56 |
| 5 | 0.86 | 65.3 | 2.56 |
| . | . | . | . |
| 50 | 6.46 | 180.6 | 2.56 |
| . | . | . | . |
| 200 | 190.18 | 565 | 2.56 |
| . | . | . | . |
| 250 | 458.82 | 693.1 | 2.56 |
| 251 | 466.79 | 695.7 | 2.56 |
| 252 | 474.89 | 698.3 | 2.56 |
| 253 | 483.13 | 700.8 | 2.56 |
| 254 | 491.51 | 703.4 | 2.56 |
| 255 | 500.02 | 705.9 | 2.56 |

| index | 0 | ... | Phmin | ... | Phmax | ... | 255 |
|---|---|---|---|---|---|---|---|
| | LUTo_n | | LUTo_Phmin | | LUTo_Phmax | | LUTo_255 |

→ (SHIFT TOWARD Lmax (TOWARD HIGH LUMINANCE-SIDE))

| ONE-GRADATION SHIFT | PREVIOUS LUT | LUTo_1 | ... | LUTo_(Phmin+1) | ... | LUTo_(Phmax+1) | ... | LUTo_255 |
|---|---|---|---|---|---|---|---|---|

| MAXIMUM SHIFT | PREVIOUS LUT | LUTo_(255-Phmax) | ... | LUTo_(Phmin+255-Phmax) | ... | LUTo_255 | ... | LUTo_255 |
|---|---|---|---|---|---|---|---|---|

GRADATION/LUMINANCE RANGE CONTROL (HIGH-LUMINANCE SHIFT)

FIG. 8B

| index | 0 | ... | Phmin | ... | Phmax | ... | 255 |
|---|---|---|---|---|---|---|---|
| | LUTo_n | | LUTo_Phmin | | LUTo_Phmax | | LUTo_255 |

← (SHIFT TOWARD Lmin (TOWARD LOW LUMINANCE-SIDE))

| ONE-GRADATION SHIFT | PREVIOUS LUT | LUTo_0 | ... | LUTo_(Phmin-1) | ... | LUTo_(Phmax-1) | ... | LUTo_254 |
|---|---|---|---|---|---|---|---|---|

| MAXIMUM SHIFT | PREVIOUS LUT | LUTo_0 | ... | LUTo_0 | ... | LUTo_Phmin | ... | LUTo_(255-Phmin) |
|---|---|---|---|---|---|---|---|---|

GRADATION/LUMINANCE RANGE CONTROL (LOW-LUMINANCE SHIFT)

| index | Phmin | ... | Pn | ... | Phmax |
|---|---|---|---|---|---|
| TARGET LUMINANCE | Lt(j_Phmin) | ... | Lt(j_Pn) | ... | Lt(j_Phmax) |

FIG. 10A

| index | 0 | ... | Phmin | ... | Phmax | ... | 255 |
|---|---|---|---|---|---|---|---|
| PREVIOUS LUT | 0 | ... | LUT_Phmin | ... | LUT_Phmax | ... | LUT_Phmax |

FIG. 10B

DISPLAY SYSTEM AND PROGRAM

TECHNICAL FIELD

The present invention relates to a display system and program that are able to favorably change a gradation characteristic of an image.

BACKGROUND ART

When displaying an image on a display system, a gradation characteristic of the display system may be changed in accordance with the user preferences or surrounding environment.

Patent Literature 1 discloses an image processing apparatus that is able to output an image on the basis of a proper gradation characteristic so as to correspond to image output devices having different image observation conditions or different output characteristics.

CITATION LIST

Patent Literature

Patent Literature 1: Japanese Unexamined Patent Application Publication No. 2004-2064426

SUMMARY OF INVENTION

Technical Problem

An object of the present invention is to provide a display system and program that are able to suppress a reduction in the visibility of an image after a gradation characteristic is changed.

Solution to Problem

Various embodiments of the present invention are described below. The embodiments below can be combined with each other.

The present invention provides a display system including a display and a display controller. The display controller includes a gradation characteristic converter. The gradation characteristic converter performs a conversion process of converting a first gradation characteristic into a second gradation characteristic. The first gradation characteristic is a characteristic in which differences between just-noticeable difference (JND) correspondence values corresponding to each gradation value are constant. The gradation characteristic converter performs the conversion process such that the differences between the JND correspondence values corresponding to each gradation value defined by the second gradation characteristic become constant. The display is configured to display input image data as an image with a luminance corresponding to the second gradation characteristic.

For example, if the quality of a medical diagnostic image displayed on a display system is reduced, diagnosability is also reduced.

According to the present invention, the conversion process of converting the first gradation characteristic in which the differences between the JND correspondence values corresponding to each gradation value are constant into the second gradation characteristic is performed. This conversion process is performed such that the differences between the JND correspondence values corresponding to each gradation value defined by the second gradation characteristic become constant. Thus, the apparent luminance can be increased or reduced in accordance with the situation while maintaining the natural visibility.

Various embodiments of the present invention are described below. The embodiments below can be combined with each other.

Preferably, the conversion process includes a shift process of shifting the first gradation characteristic toward a low gradation value-side or a high gradation value-side, and the shift process is performed such that the differences between the JND correspondence values corresponding to each gradation value in the first gradation characteristic and the second gradation characteristic are maintained.

Preferably, the display controller includes an indicator configured to indicate the number of graduations shifted in the shift process, the indicator is configured to be able to continuously change the number of shifted graduations or configured to be able to indicate the number of shifted graduations and then to further indicate the predetermined number of shifted graduations, and the shift process includes shifting the first gradation characteristic by the number of shifted graduations indicated by the indicator.

Preferably, the display controller includes an input image gradation acquisition unit, the input image gradation acquisition unit is configured to acquire any two gradation values of the input image data, and the shift process includes shifting the first gradation characteristic such that the smaller of the two gradation values corresponds to a minimum luminance of the display or the larger of the two gradation values corresponds to a maximum luminance of the display.

Preferably, the two gradation values of the input image data are a minimum gradation value and a maximum gradation value of the input image data.

Preferably, the display system further includes an operation unit configured to operate the indicator, and when one action is performed on the operation unit, the shift process is performed.

Preferably, the conversion process includes a difference change process of increasing or reducing the differences between the JND correspondence values corresponding to each gradation value in the first gradation characteristic.

Preferably, the display system further includes an indicator configured to indicate the degree of the increasing or reducing, the indicator is configured to be able to continuously change the degree of the increasing or reducing or configured to be able to indicate the degree of the increasing or reducing and then to further indicate a predetermined value as the degree of the increasing or reducing, and the difference change process includes increasing or reducing the differences between the JND correspondence values corresponding to each gradation value in the first gradation characteristic with the degree of the increasing or reducing indicated by the indicator.

Preferably, the display controller includes an input image gradation acquisition unit, the input image gradation acquisition unit is configured to acquire any two gradation values of the input image data, and the difference change process is performed such that a minimum luminance corresponding to the first gradation characteristic is set on the smaller of the two gradation values and a maximum luminance corresponding to the first gradation characteristic is set on the larger of the two gradation values.

Preferably, the two gradation values of the input image data are a minimum gradation value and a maximum gradation value of the input image data.

Preferably, the display system further includes an operation unit configured to operate the indicator, and when one action is performed on the operation unit, the difference change process is performed.

Preferably, the display system further includes a storage unit configured to store the first gradation characteristic, and a gradation characteristic rewriter configured to, after the conversion process is performed, rewrite the first gradation characteristic stored in the storage unit into the second gradation characteristic.

Preferably, the first gradation characteristic is associated with the standard display function defined by the Digital Imaging and Communications in Medicine (DICOM) standard.

Preferably, the display system further includes a display device including the display, and the display controller is disposed in the display device.

Preferably, the display system further includes a first display and a second display, the display controller is connected to the first display and the second display, and the first display and the second display are configured to display the input image data as an image with a luminance corresponding to the second gradation characteristic.

Another aspect of the present invention provides a program for causing a computer to function as a gradation characteristic converter. The gradation characteristic converter performs a conversion process of converting a first gradation characteristic into a second gradation characteristic. The first gradation characteristic is a characteristic in which differences between JND correspondence values corresponding to each gradation value are constant. The gradation characteristic converter performs the conversion process such that the differences between the JND correspondence values corresponding to each gradation value defined by the second gradation characteristic become constant. Input image data is displayed on a display as an image with a luminance corresponding to the second gradation characteristic.

Preferably, the conversion process includes a shift process of shifting the first gradation characteristic toward a low gradation value-side or a high graduation value-side, and the shift process is performed such that the differences between the JND correspondence values corresponding to each gradation value in the first gradation characteristic and the second gradation characteristic are maintained.

Preferably, the conversion process includes a difference change process of increasing or reducing the differences between the JND correspondence values corresponding to each gradation value in the first gradation characteristic.

BRIEF DESCRIPTION OF THE DRAWINGS

FIG. 1 is an example of a table showing the relationship between the JND and luminance.

FIG. 4 is a part of the standard display function defined by the DICOM standard and shows luminances L(j) and JND correspondence values j corresponding to gradation values P of 0 to 255 and the differences Δj between the JND correspondence values j corresponding to each of the gradations.

FIG. 8A is a table showing gradation/luminance range control (high-luminance shift) performed by the display system 100 of the present invention, and FIG. 8B is a table showing gradation/luminance range control (low-luminance shift).

FIG. 10A is a table showing a JND maximizer [a process of increasing the differences between the JND correspondence values corresponding to each gradation value; an aspect of a JND enhancer (to be discussed later)], the JND enhancer, and a JND suppressor performed by the display system 100 according to the second aspect of the present invention, and FIG. 10B is a table obtained by increasing or reducing the differences between the JND correspondence values corresponding to each gradation value.

DESCRIPTION OF EMBODIMENTS

Now, embodiments of the present invention will be described with reference to the drawings. Various features described in the embodiments below can be combined with each other.

1. JND Correspondence Value

First, the JND correspondence value will be described. As shown in FIG. 1, the term "JND correspondence value" refers to a value corresponding to a luminance one-to-one. An example of the JND correspondence value is a JND index according to the DICOM standard based on the Barten Model for visual recognition. FIG. 1 represents the standard display function defined by the DICOM standard. The term "JND index" refers to a value such that when the minimum luminance difference of a given target recognizable by an average human observer is defined as one just-noticeable difference (JND), one step in the index results in a luminance difference, which is a JND. Instead of the JND index, data corresponding to the minimum luminance difference recognizable by the observer derived from a method other than the Barten Model may be used as the JND correspondence value.

The DICOM standard defines the standard display function (=gradation characteristic) that makes constant the differences between the JND correspondence values corresponding to each of the gradations when displaying an image, on the basis of ergonomics. Thus, the visibility of an image having low-to-high gradations becomes natural to human eyes. For this reason, a medical monitor, for example, preferably has a gradation characteristic according to the standard display function so that accurate image interpretation or diagnosis can be realized.

2. Display System 100

Next, referring to FIGS. 2 to 5, the configuration of a display system 100 will be described. Note that only the basic functions of the elements of the display system 100 are described below with reference to FIGS. 2 to 5 and processes performed by the elements will be described in detail later.

Figure 2:
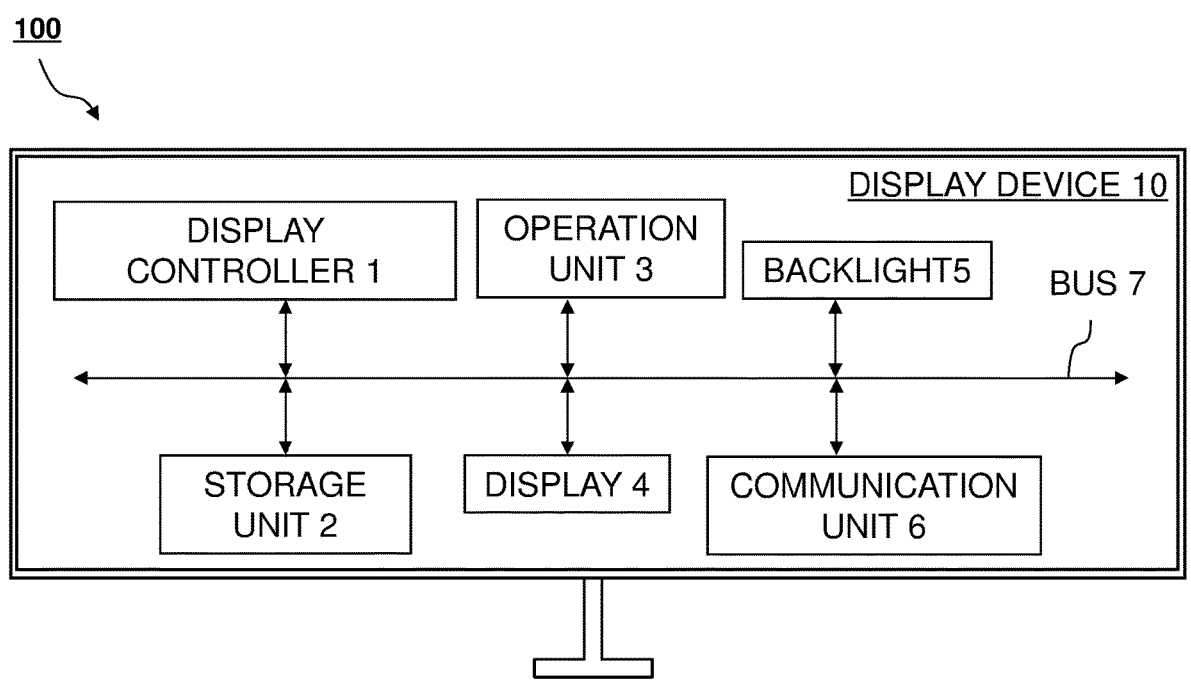
FIG. 2 is a schematic diagram showing the hardware configuration of a display system 100 according to an embodiment of the present invention.
Figure 3:
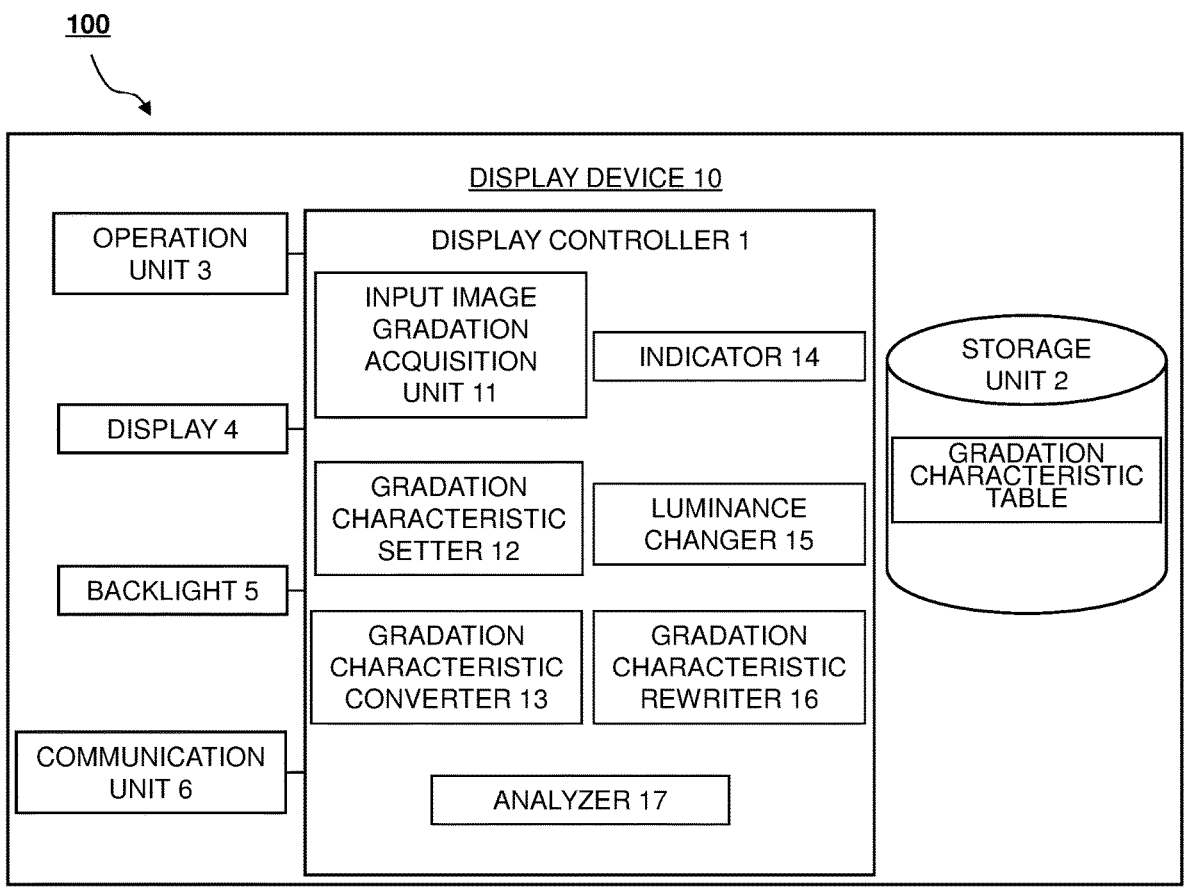
FIG. 3 is a functional block diagram of the display system 100 according to the embodiment of the present invention.

As shown in FIGS. 2 and 3, the display system 100 includes a display device 10 including a display 4 and a display controller 1. The display device 10 also includes a storage unit 2, an operation unit 3, a backlight 5, a communication unit 6, and a bus 7. The display controller 1 is, for example, a CPU or the like, and reads programs (not shown) stored in the storage unit 2 and performs various types of arithmetic processing. The storage unit 2 is, for example, a memory, HDD, or SSD, and stores a first gradation characteristic set on the display 4 and various types of data or programs. These programs may be preinstalled when shipping the display system 100, or may be downloaded from Web sites as applications, or may be by wire or wirelessly transferred from a different information processing device or a storage medium. The operation unit 3 is, for example, a mouse, a keyboard, a touchscreen, a speech input unit, or a motion recognition device using a camera or the like and is used to operate the display system 100. The display 4 is, for example, a liquid crystal display, an organic EL display, a touchscreen display, electronic paper, or any other type of display and displays input image data (including still and moving images) as images. The backlight 5 illuminates the display 4 from the back of the display 4. Note that if the display 4 is not a liquid crystal display, the backlight 5 is not needed. The communication unit 6 is any type of I/O and transmits and receives various types of data to and from the different information processing device and the other elements. The bus 7 is a serial bus, parallel bus, or the like and electrically connects the elements so that various types of data can be transmitted and received therebetween.

The elements may be implemented by software or hardware. In the case of software, the elements are implemented by execution of a program by the CPU. The program may be stored in the built-in storage unit 2 or a computer-readable, non-transitory storage medium. It is also possible to read the program from an external storage unit and to implement the elements by execution of the program by so-called "cloud computing." In the case of hardware, the elements may be implemented by various types of circuits, such as ASIC, FPGA, and DRP. Various types of information and concepts including the information handled in the present embodiment are represented by the magnitude of signals, which are binary bit aggregates consisting of 0 and 1, and communication or arithmetic processing of the signals are executed by the above-mentioned software or hardware.

As shown in FIG. 3, the display controller 1 includes an input image gradation acquisition unit 11, a gradation characteristic setter 12, a gradation characteristic converter 13, an indicator 14, a luminance changer 15, a gradation characteristic rewriter 16, and an analyzer 17.

The input image gradation acquisition unit 11 is configured to acquire any two gradation values of input image data inputted to the display system 100. In the present embodiment, the two gradation values may be the minimum gradation value and maximum gradation value of the input image data. In the present embodiment, the input image data is monochrome-still-image data. The input image gradation acquisition unit 11 acquires the minimum gradation value (Pmin) and maximum gradation value (Pmax) of the input image data on the basis of histogram analysis on the input image data performed by the analyzer 17 (to be discussed later). Histogram analysis may be performed on the entire input image data, or may be performed on one range (=an area of interest) of the input image data. Also, histogram analysis may be performed each time the input image data is changed or each time the area of interest in the input image data is changed.

Figure 5:
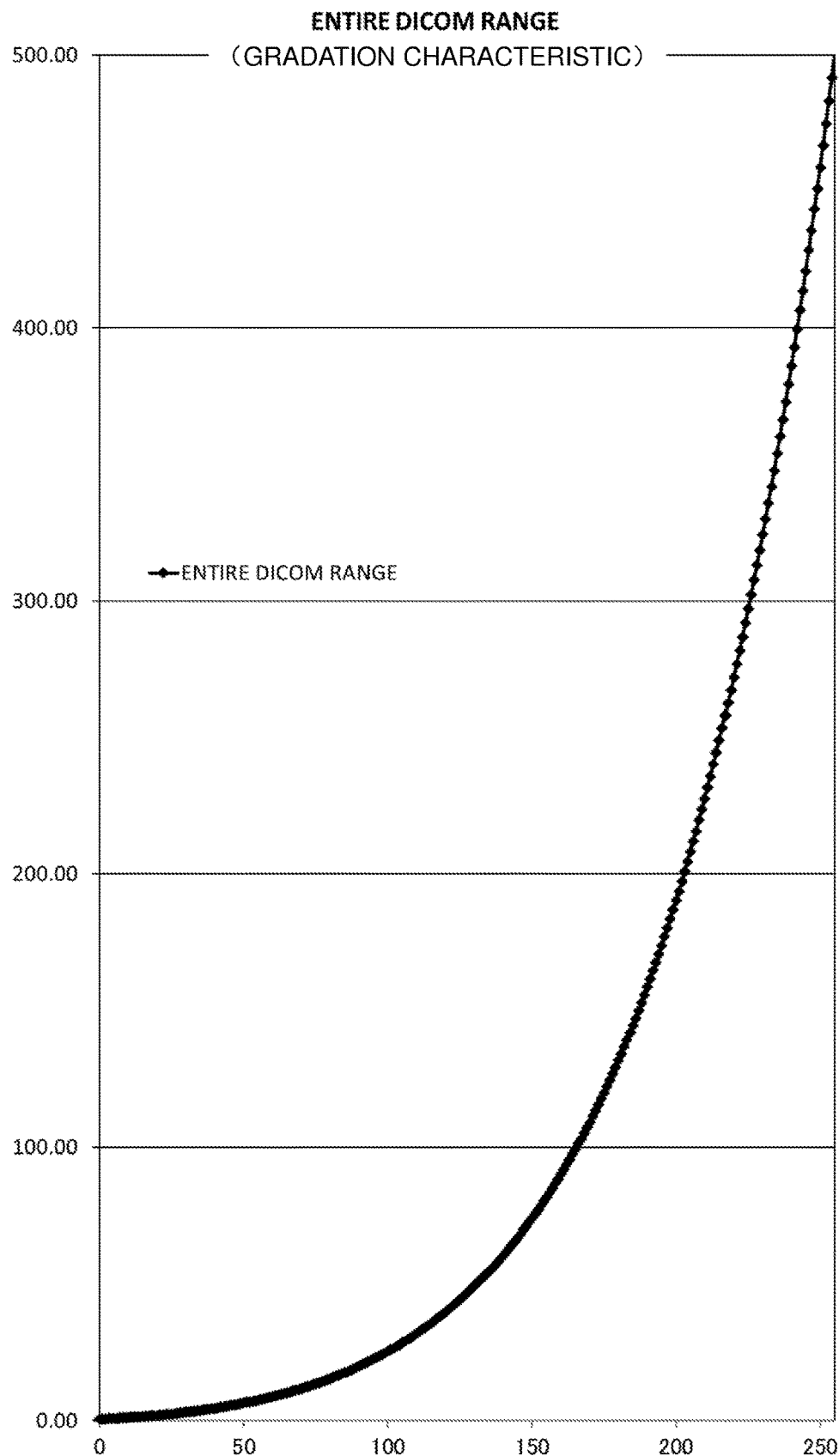
FIG. 5 is a graph showing the standard display function of FIG. 4.

The gradation characteristic setter 12 is configured to set a first gradation characteristic on the display 4. In the present embodiment, the gradation characteristic setter 12 acquires a gradation characteristic table (=a table defining the first gradation characteristic) stored in the storage unit 2 and sets this gradation characteristic table on the display 4. The first gradation characteristic used in the present embodiment is a characteristic in which the differences between the JND correspondence values corresponding to each gradation value are constant. Specifically, as shown in FIG. 4, in the present embodiment, the first gradation characteristic is associated with the standard display function defined by the DICOM standard. As shown in FIG. 4, the luminances L(j) correspond to the gradation values P of 0 to 255 one-to-one. Since the luminances L(j) and JND correspondence values(j) correspond to each other one-to-one as shown in FIG. 1, the JND correspondence values(j) correspond to the gradation values P of 0 to 255 one-to-one. The luminances L(j) are set such that the differences Δj between the JND correspondence values corresponding to each of the gradation values P of 0 to 255 become constant. In an example in FIG. 4, the differences Δj between the JND correspondence values corresponding to each of the gradations are 2.56. FIG. 5 is a graph obtained by visualizing the gradation characteristic table in FIG. 4.

The gradation characteristic converter 13 performs a conversion process of converting the first gradation characteristic into a second gradation characteristic. In the present embodiment, the gradation characteristic converter 13 is configured to perform this conversion process such that the differences between the JND correspondence values corresponding to each gradation value defined by the second gradation characteristic become constant. The conversion process includes a shift process and a difference change process. The shift process is a process of shifting the first gradation characteristic toward the low gradation value-side or high gradation value-side. The shift process is performed such that the differences between the JND correspondence values corresponding to each gradation value in the first gradation characteristic and second gradation characteristic are maintained. In the shift process, the first gradation characteristic may be shifted such that the smaller of any two gradation values of the input image data corresponds to the minimum luminance of the display 4 or the larger of the two gradation values corresponds to the maximum luminance of the display 4. In the present embodiment, the two gradation values may be the minimum gradation value and maximum gradation value of the input image data. In this case, the first gradation characteristic may be shifted to a gradation range including the maximum luminance or minimum luminance of the display 4. The difference change process is a process of increasing or reducing the differences between the JND correspondence values corresponding to each gradation value in the first gradation characteristic. The difference change process may be performed such that the minimum luminance corresponding to the first gradation characteristic is set on the minimum gradation value and the maximum luminance corresponding to the first gradation characteristic is set on the maximum gradation value.

The display 4 is configured to display the input image data as an image with luminances corresponding to the second gradation characteristic obtained by the conversion by the gradation characteristic converter 13.

The operation unit 3 is used to operate the indicator 14. In the present embodiment, the shift process is performed when one action is performed on the operation unit 3. Also, in the present embodiment, the difference change process is performed when one action is performed on the operation unit 3. The "one action" here refers to a so-called "one click" and is, for example, is performed using software, a key of the display device 10, or a short-cut function of the keyboard or the like.

The indicator 14 indicates the number of shifted gradations in the shift process. In the present embodiment, the indicator 14 is configured to be able to continuously change the number of shifted graduations, or configured to be able to indicate the number of shifted graduations and then to further indicate the predetermined number of shifted graduations. For example, assume that the number of shifted graduations is 0 to 255. In this case, the user may directly input 0, 20, 40, 60, 80, 100, 200, 255, or the like using the operation unit 3. For example, if the operation unit 3 is a mouse, the user may continuously increase or reduce the number of shifted graduations in a range of 0 to 255 while moving the mouse. In the shift process, the gradation characteristic converter 13 shifts the first gradation characteristic by the number of shifted graduations indicated by the indicator 14.

The indicator 14 also has a function of indicating the degree of increase or reduction in the difference change process. In the present embodiment, the indicator 14 is configured to be able to continuously change the degree of increase or reduction, or configured to be able to indicate the degree of increase or reduction and then to further indicate a predetermined value as the degree of increase or reduction. For example, assume that the degree of increase or reduction is 0 to 100%. In this case, the user may directly input 0, 20, 40, 60, 80, 100%, or the like using the operation unit 3. For example, if the operation unit 3 is a mouse, the user may continuously increase or reduce the degree of increase or reduction in a range of 0 to 100% while moving the mouse. In the difference change process, the gradation characteristic converter 13 increases or reduces the differences between the JND correspondence values corresponding to each gradation value in the first gradation characteristic with the degree of increase or reduction indicated by the indicator 14.

The luminance changer 15 is configured to be able to change the luminances with the second gradation characteristic maintained. The display 4 displays the input image data as an image with the luminances changed by the luminance changer 15. If luminance/gradation range control is performed in a range having a recommended maximum luminance of, for example, 500 cd/m² and then it is preferred to further increase the luminance, the gradation characteristic is shifted toward the luminance upper-limit side in a range having an upper-limit output luminance of, for example, 600 to 700 cd/m². Thus, the luminances obtained by performing luminance/gradation range control can be changed. Note that the term "shift" here refers to parallel movement on the graph.

The gradation characteristic rewriter 16 rewrites the first gradation characteristic. Specifically, after the conversion process is performed, the gradation characteristic rewriter 16 rewrites the first gradation characteristic stored in the storage unit 2 into the second gradation characteristic and thus changes the gradation characteristic of the display 4.

As described above, the analyzer 17 performs histogram analysis on the input image data.

In the present embodiment, the display controller 1 is disposed in the display device 10.

3. Luminance/Gradation Range Control (Shift Process)

Figure 9:
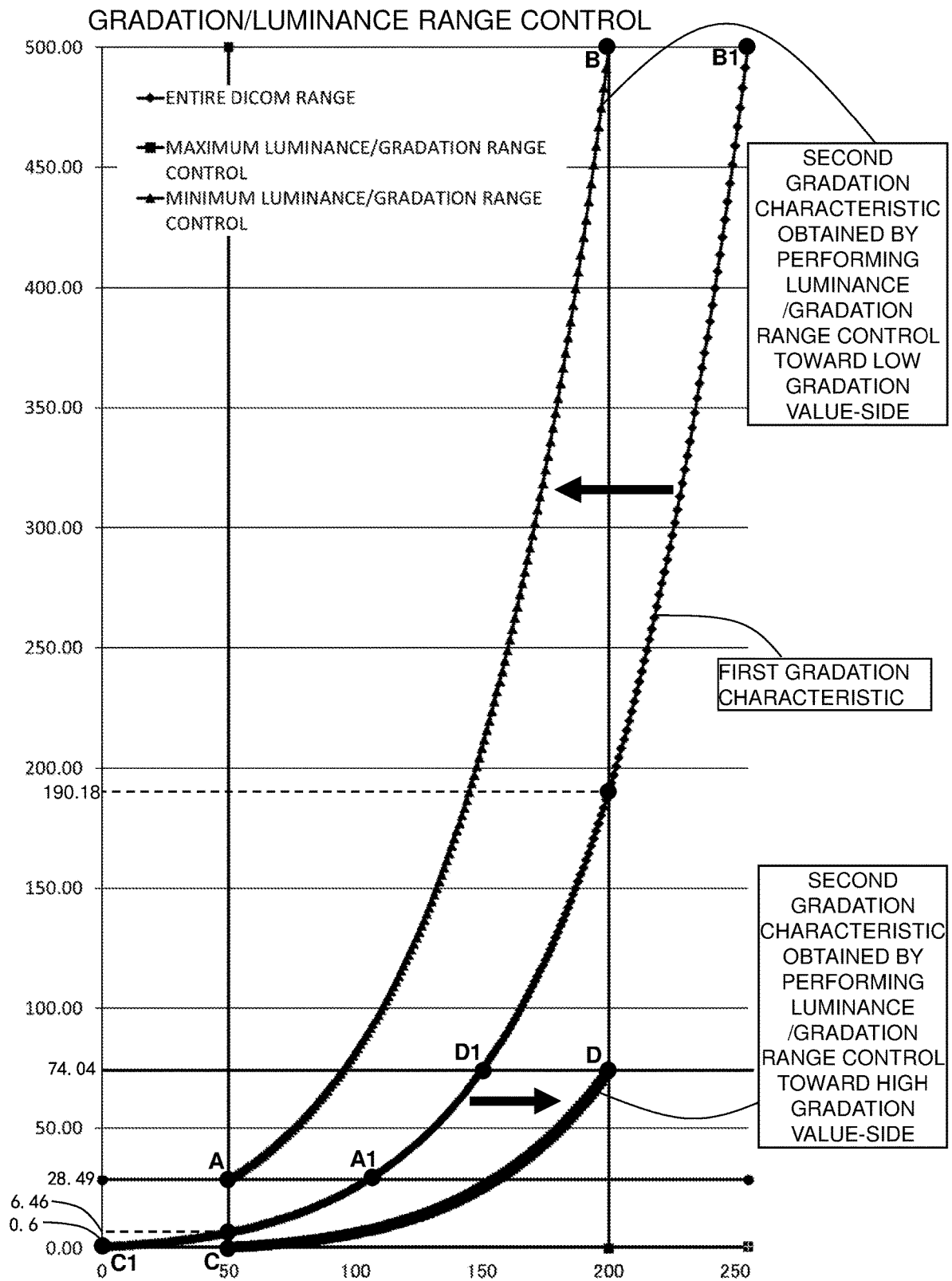
FIG. 9 is a graph showing a gradation characteristic obtained by performing a high-luminance shift and a gradation characteristic obtained by performing a low-luminance shift.

Next, luminance/gradation range control according to one embodiment will be described with reference to FIGS. 6, 8, and 9. The term "luminance/gradation range control" refers to a type of conversion process performed by the gradation characteristic converter 13 and is a shift process of shifting the first gradation characteristic toward the low gradation value-side or high gradation value-side. The shift process is performed such that the differences between the JND correspondence values corresponding to each gradation value in the first gradation characteristic and second gradation characteristic are maintained. The number of shifted gradations in the shift process is indicated by the indicator 14. Examples in FIG. 9 represent "maximum shifts," in which the first gradation characteristic is shifted to a gradation range including the maximum luminance or minimum luminance of the display 4.

Figure 6:
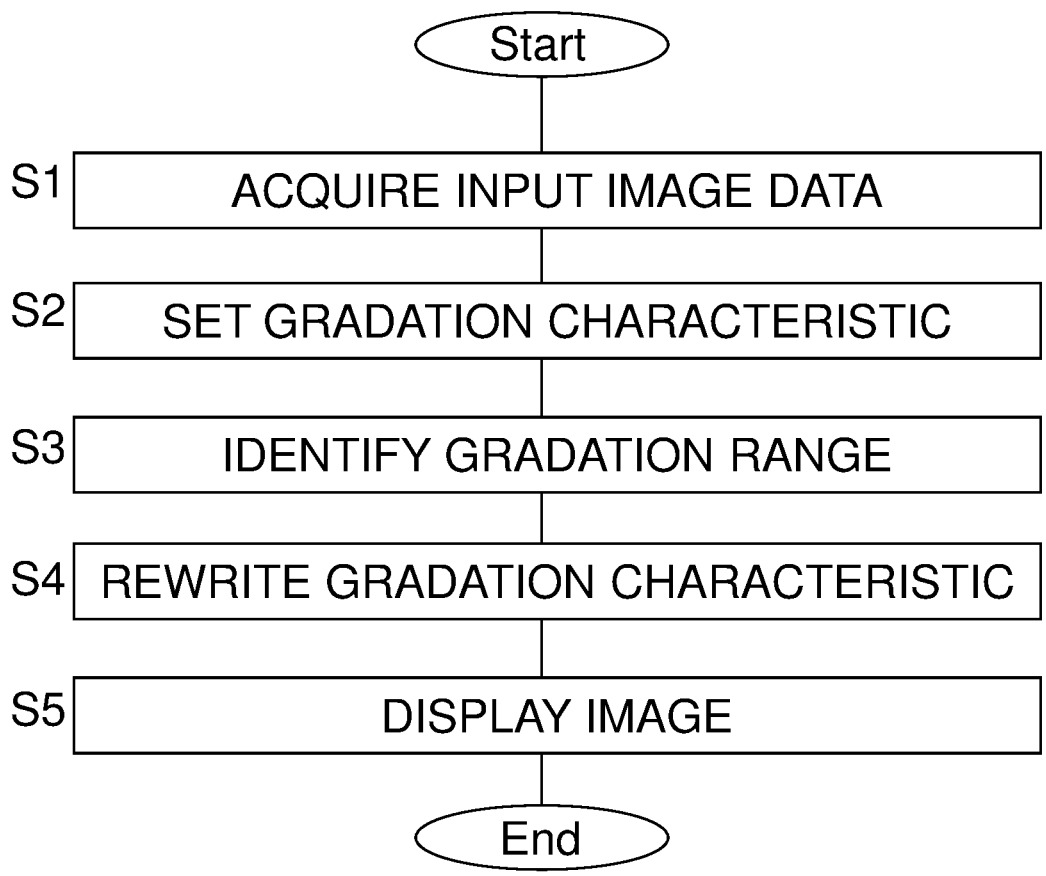
FIG. 6 is a flowchart showing a process performed by the display system 100 of the present invention.

As shown in FIG. 6, first, in S1, the display system 100 acquires the input image data. In the present embodiment, the input image gradation acquisition unit 11 acquires the minimum gradation value and maximum gradation value of the input image data. In the present embodiment, it is assumed that the process is performed under the following conditions. These conditions also apply to a JND enhancer (JND maximizer) and a JND suppressor (to be discussed later).

The minimum gradation value and maximum gradation value of the input image data: 50,200 (the results of the histogram analysis performed by the analyzer 17)

Gradation characteristics: characteristics of the gradations 0 to 255 are defined as follows.

Gradation value 0: 0.6 cd/m²
Gradation value 50: 28.49 cd/m²
Gradation value 200: 190.18 cd/m²
Gradation value 255: 500.02 cd/m²

Luminance of display 4
Lmax (maximum luminance): 500.02 cd/m²
Lmix (minimum luminance): 0.6 cd/m²

Then, in S2, the gradation characteristic setter 12 acquires the gradation characteristic table (first gradation characteristic) stored in the storage unit 2 and sets it on the display 4.

Then, in S3, the gradation characteristic converter 13 performs the conversion process of converting the first gradation characteristic into the second gradation characteristic. The gradation characteristic converter 13 performs this conversion process such that the differences between the JND correspondence values corresponding to each gradation value defined by the second gradation characteristic become constant. This conversion process is luminance/gradation range control, that is, a shift process. The shift process is performed such that the differences between the JND correspondence values corresponding to each gradation value in the first gradation characteristic and second gradation characteristic are maintained. Specifically, the number of shifted graduations is indicated by the indicator 14 and then the gradation characteristic converter 13 acquires the number of gradations (151) from the minimum gradation value (50) to the maximum gradation value (200) of the input image data. The gradation characteristic converter 13 then specifies any gradation range matching this number of gradations (151) in the first gradation characteristic set in S2.

This process is a shift process of shifting the first gradation characteristic toward the high gradation value-side or low gradation value-side shown in FIG. 9. Hereafter, the gradation characteristic table may be referred to as the "previous LUT."

(1) Shift Toward Low Gradation Value-Side

A process of displaying the input image data as an image with the maximum luminance of the display 4 will be described below. In the present embodiment, the number of shifted graduations indicated by the indicator 14 is 55. As shown in FIG. 8A, in the first gradation characteristic, when the index (the index indicating the gradation value) is n, the luminance is $LUT_0\_n$ (n: 0 to 255). That is, when the index is 0, the luminance is $LUT_0\_0$; when the index is the minimum gradation value (referred to as "Phmin"), the luminance is $LUT_0\_Phmin$; when the index is the maximum gradation value (referred to as "Phmax"), the luminance is $LUT_0\_Phmax$; and when the index is 255, the luminance is $LUT_0\_255$. Specifically, in the present embodiment, as shown in FIG. 4, when the gradation value is 0, the luminance is 0.6 cd/m²; when the gradation value is the minimum gradation value (50), the luminance is 6.46 cd/m²; when the gradation value is the maximum gradation value (200), the luminance is 190.18 cd/m²; and when the gradation value is 255, the luminance is 500.02 cd/m² (hereafter, 500 cd/m² for simplicity).

Luminances obtained by shifting the luminance corresponding to the index Phmin (50) to $LUT_0\_105$ [=Phmin (50)+255−Phmax (200)] are shown in a lower previous LUT.

As shown in FIG. 9, this is a process of shifting the first gradation characteristic toward the left side (=low gradation value-side) by 55 gradation values while maintaining the differences between the JND correspondence values corresponding to each gradation value in the first gradation characteristic and second gradation characteristic. An example in FIG. 9 represents a "maximum shift" in which, when the number of shifted graduations indicated by the indicator 14 is 55, the first gradation characteristic is shifted to a gradation range including the maximum luminance of the display 4 [that is, a range in which the gradation value 255 of the first gradation characteristic is included in the maximum gradation value (200)]. If the number of shifted graduations is set to 56 or more in the present embodiment, there would be no luminance corresponding to the maximum gradation value (200) in the second gradation characteristic. For this reason, the upper limit of the number of shifted graduations is set to 55.

The minimum gradation value and maximum gradation value of the input image data are 50 and 200, respectively. If the gradation value is in a range smaller than 50 or greater than 200, no image is displayed on the display 4. In FIG. 9, the luminance of point A (gradation value 50) obtained by shifting the first gradation characteristic is 28.49 cd/m$^2$, which is the luminance of point A1 (gradation value 105) of the first gradation characteristic. Also, the luminance of point B (gradation value 200) obtained by shifting the first gradation characteristic is 500 cd/m$^2$, which is the luminance of point B1 (gradation value 255) of the first gradation characteristic.

As seen above, in S3, the indicator 14 indicates the number of graduations shifted in the shift process, and the gradation characteristic converter 13 identifies the gradation range (105 to 255) used as the second gradation characteristic in the first gradation characteristic. At this time, the gradation characteristics converter 13 calculates the gradation value of 105 by adding the number of shifted graduations of 55 to the minimum gradation value (50) or by subtracting, from the maximum gradation value (255) of the first gradation characteristic, the number of gradations (151) from the minimum gradation value (50) to the maximum gradation value (200) of the input image data. The gradation characteristics converter 13 then obtains the second gradation characteristic by shifting the first gradation characteristic to the gradation range including the maximum luminance of the display 4.

The indicator 14 may be configured to be able to indicate the number of shifted graduations and then to further indicate the predetermined number of shifted graduations. For example, the indicator 14 may indicate 55 as the number of shifted graduations and then update the predetermined number of shifted graduations to 54, 53, . . . and 1. Thus, gradation ranges 104 to 254, 103 to 253, . . . , and 51 to 201 in the first gradation characteristic can be determined as second gradation characteristics. For example, if the operation unit 3 is a mouse, the user may continuously change the number of shifted graduations by moving the mouse or controlling a scroll bar or the like.

By operating the operation unit 3, the user transmits an instruction to indicate the number of shifted graduations, to the indicator 14.

After the shift process is performed in S3, the gradation characteristic rewriter 16, in S4, rewrites the first gradation characteristic stored in the storage unit 2 into the second gradation characteristic. In the present embodiment, the gradation characteristic rewriter 16 rewrites the first gradation characteristic stored in the storage unit 2 into the second gradation characteristic by using the relationship between the identified gradation value and luminance, that is, by using the luminances corresponding to the gradation range (105 to 255) of the first gradation characteristic as the luminances corresponding to the gradation range (50 to 200) of the resulting second gradation characteristic. While the process performed by the gradation characteristic rewriter 16 is described as S4 for convenience, rewriting of the gradation characteristic may be performed simultaneously with S3.

As with those in the original first gradation characteristic, the differences $\Delta j$ between the JND correspondence values corresponding to each of the adjacent gradations in the resulting second gradation characteristic are 2.56 and are also constant.

Finally, in S5, the display 4 displays the input image data as an image with the luminances corresponding to the second gradation characteristic. More specifically, the display 4 displays this image using the luminances corresponding to the gradation range of 105 to 255 in the original first gradation characteristic identified by the gradation characteristic converter 13 as the luminances corresponding to the gradation range (50 to 200) in the resulting second gradation characteristic.

As seen above, by performing the shift process of shifting the first gradation characteristic to the low gradation value-side (maximum shift), the display luminance range of the display 4 is changed as follows.

Before shift: 6.46 to 190.18 cd/m$^2$ (a range corresponding to the gradation values of 50 to 200)
After shift: 28.49 to 500 cd/m$^2$ (a range corresponding to the gradation values of 50 to 200; a range that has corresponded to the gradation values of 105 to 255 before shift)

By changing the gradation characteristic as described above, the input image data can be displayed as an image using the maximum luminance of 500 cd/m$^2$ of the display 4 without having to correct the input image data. Also, increasing the display luminance can reduce the influence of ambient illuminance on image interpretation or diagnosis, leading to an improvement in the visibility of medical diagnostic images and facilitation of finding of abnormal portions. Further, even after the shift, the differences $\Delta j$ between the JND correspondence values corresponding to each of the adjacent gradations are constant, preventing a loss of the visibility of the image.

While, in the present embodiment, the maximum shift having the number of shifted graduations of 55 has been described as an example, the number of shifted graduations need not be 55 and the gradation/luminance range may be shifted by any number of gradations. For example, if the operation unit 3 is a mouse, the user may shift the gradation/luminance range toward the high luminance-side by sliding the mouse rightward. Also, if the operation unit 3 is a mouse, the user may shift the gradation/luminance range toward the high luminance-side by the predetermined number of gradations (e.g., 5 gradations) each time the user clicks the left, right, or any other button of the mouse. In this case, the input image gradation acquisition unit 11 does not have to identify any gradation range in the first gradation characteristic matching the number of gradations from the minimum gradation value to the maximum gradation value of the input image data.

Also, when one action is performed on the operation unit 3, the gradation characteristic converter 13 may shift the first gradation characteristic to the gradation range including the maximum luminance of the display 4. Thus, the gradation characteristics converter 13 is able to easily realize the above maximum shift (the shift of the first gradation characteristic to the gradation range including the gradation value of 255). Also, even after the indicator 14 indicates the number of shifted graduations, the maximum shift may be performed by one action on the operation unit 3.

Also, after having been shifted to the low gradation value-side, the first gradation characteristic may be further shifted in the up-down direction of FIG. 9.

Further, after the first gradation characteristic has been shifted toward the low gradation value-side, the luminance changer 15 may change the luminances identified by the gradation characteristic converter 13 (the luminances corresponding to the gradation range of 105 to 255 in the first gradation characteristic) with this gradation characteristic maintained, and the display 4 may display the input image data as an image with the changed luminances.

(2) Shift Toward High Gradation Value-Side

Next, a shift toward the high gradation value-side will be described with reference to FIGS. 6, 8A, 8B, and 9. This process is a process opposite to the above-mentioned shift toward the low gradation value-side and reduces the display luminance.

In the present embodiment, the number of shifted graduations indicated by the indicator 14 is 50. The gradation characteristic converter 13 identifies a gradation range (0 to 150) in the first gradation characteristic. At this time, the gradation characteristics converter 13 calculates the gradation value 0 by subtracting the number of shifted graduations 50 from the minimum gradation value (50). Thus, the gradation characteristics converter 13 is able to shift the first gradation characteristic to a gradation range including the minimum luminance of the display 4 [that is, a range in which the gradation value of 0 of the first gradation characteristic is included in the minimum gradation value (0)]. The reason why, in the present embodiment, the upper limit of the number of shifted graduations is set to 50 is that if the number of shifted graduations is set to greater than 50, there would be no luminance corresponding to the minimum gradation value (50) in the second gradation characteristic.

The first gradation characteristic shown in FIG. 8B is similar to that in FIG. 8A and therefore will not be described. Luminances obtained by shifting the luminance corresponding to the index Phmax to $LUT_0\_150$ [=Phmax (200)−Phmin (50)] are shown in a lower previous LUT as a shift toward the high gradation value-side.

As shown in FIG. 9, the shift to the high gradation value-side is a process of shifting the first gradation characteristic toward the right side (=high gradation value-side) by 50 gradations while maintaining the differences between the JND correspondence values corresponding to each gradation value in the first gradation characteristic and second gradation characteristic. Since the minimum gradation value and maximum gradation value are 50 and 200, respectively, no image is displayed on the display 4 in the gradation range smaller than 50 or the gradation range exceeding 200. In FIG. 9, the luminance of point C (gradation value of 50) of the shifted first gradation characteristic is 0.6 cd/m$^2$, which is the luminance of point C1 (gradation value 0) of the original first gradation characteristic. Also, the luminance of point D (gradation value 200) of the shifted first gradation characteristic is 74.04 cd/m$^2$, which is the luminance of point D1 (gradation value 150) of the original first gradation characteristic.

As seen above, by performing the shift process of shifting the first gradation characteristic to the high gradation value-side (maximum shift), the display luminance range of the display 4 is changed as follows.

Before shift: 6.46 to 190.18 cd/m$^2$ (a range corresponding to the gradation values of 50 to 200)

After shift: 0.6 to 74.04 cd/m$^2$ (a range corresponding to the gradation values 50 to 200; a range that has corresponded to the gradation values of 0 to 150 before shift)

By changing the gradation characteristic as described above, the input image data can be displayed as an image using down to the minimum luminance of 0.6 cd/m$^2$ of the display 4 without having correct the input image data. Thus, the eye fatigue of the user can be reduced. Even after the shift, the differences Δj between the JND correspondence values corresponding to each of the adjacent gradations are constant. Thus, a reduction in the visibility of the image can be suppressed.

The other processes are similar to those of the shift to the low gradation value-side and therefore will not be described.

While, in the present embodiment, the maximum shift having the number of shifted graduations of 50 has been described as an example, the number of shifted graduations need not be 50 and the gradation/luminance range may be shifted by any gradations. For example, if the operation unit 3 is a mouse, the user may shift the gradation/luminance range toward the low luminance-side by sliding the mouse leftward. Also, if the operation unit 3 is a mouse, the user may shift the gradation/luminance range toward the low luminance-side by the predetermined number of gradations (e.g., 5 gradations) each time the user clicks the left, right, or any other button of the mouse. In this case, the input image gradation acquisition unit 11 does not have to identify any gradation range in the first gradation characteristic matching the number of gradations from the minimum gradation value to the maximum gradation value of the input image data.

Also, when one action is performed on the operation unit 3, the gradation characteristic converter 13 may shift the first gradation characteristic to the gradation range including the minimum luminance of the display 4. Thus, the gradation characteristics converter 13 is able to easily realize the above maximum shift (the shift of the first gradation characteristic to the gradation range including the gradation value of 0). Note that when one action is performed on the operation unit 3, the gradation characteristics converter 13 may shift the first gradation characteristic such that the smaller of any two gradation values of the input image data corresponds to the minimum luminance of the display 4 or the larger of the two gradation values of the input image data corresponds to the maximum luminance of the display 4. Also, even after the indicator 14 indicates the number of shifted graduations, the maximum shift may be performed by one action on the operation unit 3.

Also, after having been shifted to the high gradation value-side, the first gradation characteristic may be further shifted in the up-down direction of FIG. 9.

After the first gradation characteristic has been shifted toward the low luminance-side, the luminance changer 15 may change the luminances identified by the gradation characteristic converter 13 (the luminances corresponding to the gradation range of 0 to 150 in the original gradation characteristic) with this gradation characteristic maintained, and the display 4 may display the input image data as an image with the changed luminances.

By performing luminance/gradation range control (shift process) according to the present embodiment, an image can be displayed in an appearance suitable for the user's application.

4. JND Maximizer (Difference Change Process)

Figure 11:
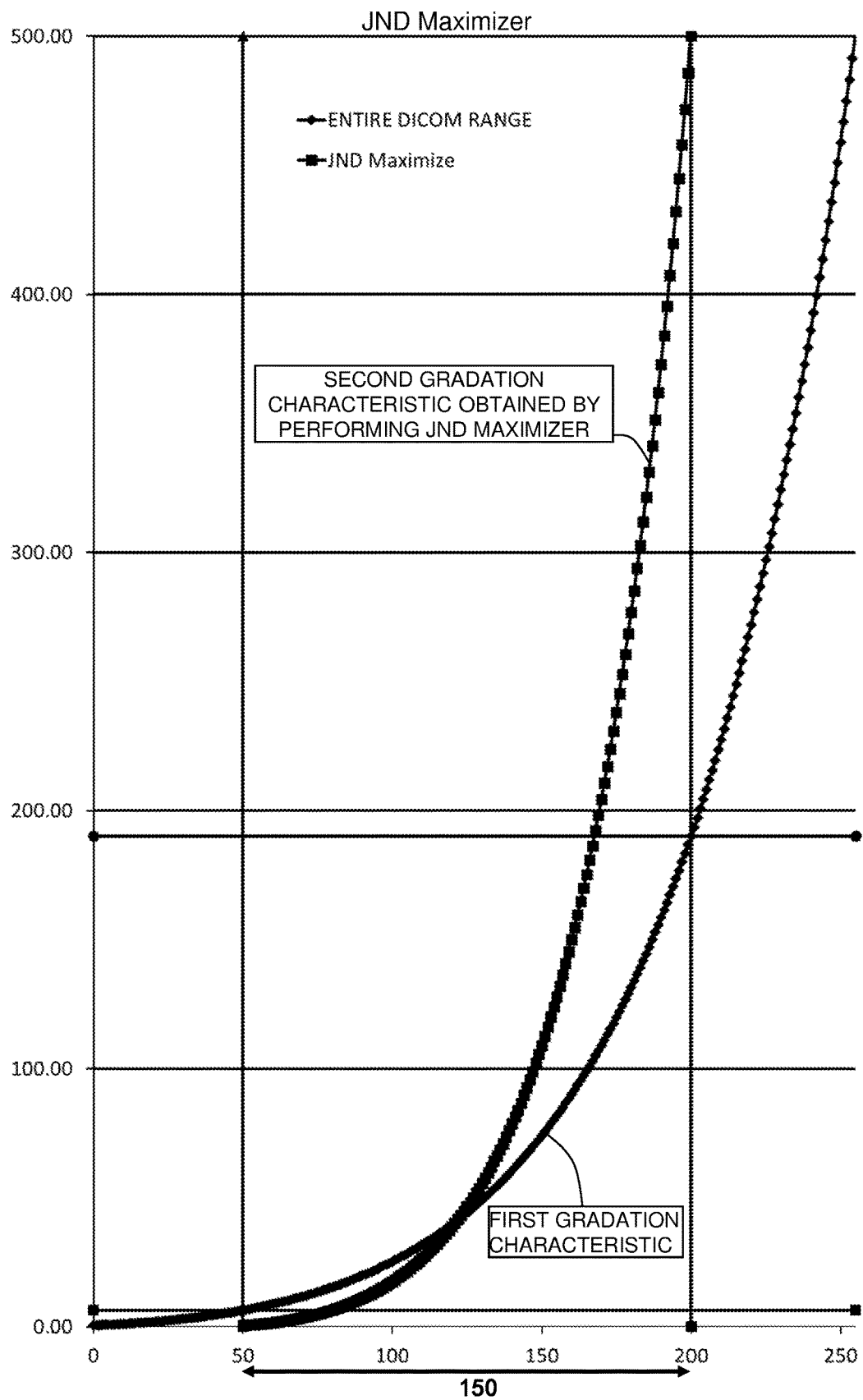
FIG. 11 is a graph showing a gradation characteristic obtained by increasing the differences between the JND correspondence values corresponding to each gradation value by the JND maximizer.

A JND maximizer, which is one form of JND enhancer, will be described below with reference to FIGS. 7, 10, and 11. In the present embodiment, a JND enhancer performs a difference change process of increasing the differences between the JND correspondence values corresponding to each gradation value in the first gradation characteristic. In the present embodiment, the difference change process is performed such that the minimum luminance corresponding to the first gradation characteristic is set on the smaller of any two gradation values of the input image data and the maximum luminance corresponding to the first gradation characteristic is set on the larger of the two gradation values of the input image data. The two gradation values may be the minimum gradation value and maximum gradation value of the input image data. Specifically, a luminance corresponding to a predetermined gradation value is used as a reference, and luminances corresponding to the gradation values other than the predetermined gradation value are set such that the differences between the JND correspondence values corresponding to each gradation value are increased and the increased differences become constant. As used herein, the phrase "luminances corresponding to the gradation values other than a predetermined gradation value are set" includes setting the luminances corresponding to the gradation values other than the predetermined gradation value without overwriting the luminance corresponding to the predetermined gradation value, as well as overwriting the luminance corresponding to the predetermined gradation value with the same luminance and then setting the luminances corresponding to the gradation values other than the predetermined gradation value. The JND maximizer is a JND enhancer that maximizes the differences between the JND correspondence values. An example in which the minimum gradation value and maximum gradation value of the input image data are set to 50 and 200, respectively, will be described below.

4-1. Overview

First, a second gradation characteristic obtained by performing the JND maximizer will be described with reference to FIG. 11. As shown in FIG. 11, by performing the JND maximizer, there is obtained a second gradation characteristic having higher luminances than those of the first gradation characteristic in a higher gradation range than the gradation value of the intersection of the two gradation characteristics in the gradation range from the minimum gradation value (50) to the maximum gradation value (200). This JND maximizer calculation process will be described below.

A JND correspondence value corresponding to the changed gradation value Pn is represented by j_Pn, and the target luminance is represented by Lt(j_Pn). Pn is an integer in the gradation range from the minimum gradation value to the maximum gradation value.

In the present embodiment, the target luminances Lt(j_Pn) in the gradation range from the minimum gradation value to the maximum gradation value are calculated in the following steps. The original gradation characteristic is shown in FIG. 10A. As shown in FIG. 10B, a previous LUT_Pn is calculated in the following steps such that the target luminances corresponding to the gradation values in the range from Phmin to Phmax become Lt(j_Pn).

S1: Set luminances corresponding to minimum gradation value and maximum gradation value.

The target luminance $Lt(j\_P_{50})$ corresponding to the minimum gradation value (50) is set to Lmin (minimum luminance: 0.6 cd/m$^2$), and the target luminance $Lt(j\_P_{200})$ corresponding to the maximum gradation value (200) is set to Lmax (maximum luminance: 500 cd/m$^2$). In the present embodiment, a luminance corresponding to a predetermined gradation value (the gradation value of the intersection of the first gradation characteristic and the second gradation characteristic obtained by performing the JND maximizer) is used as a reference. In other words, this luminance is fixed before and after the JND maximizer is performed.

S2: Calculate JND correspondence values j_Pn

JND correspondence values j_Pn corresponding to the gradation values Pn in the gradation range from the minimum gradation value to the maximum gradation value are calculated. This process is performed such that the differences between the JND correspondence values corresponding to each gradation value are increased and the increased differences become constant.

S3: Calculate the target luminances Lt(j_Pn)

The target luminances Lt(j_Pn) corresponding to the gradation values Pn in the gradation range from the minimum gradation value to the maximum gradation value are identified on the basis of the JND correspondence values j_Pn calculated in S2.

The above steps will be described more specifically. In the present embodiment, in S2, the JND correspondence values j_Pn are calculated by Formula 1 below.

$$j\_Pn = (j(Lmax) - j(Lmin))/(Phmax - Phmin)*(Pn - Phmin) + j(Lmin)$$ [Formula 1]

(Pn represents an integer in the gradation range from Phmin to Phmax.)

Formula 1 makes constant the differences between the JND correspondence values j_Pn corresponding to each gradation value Pn by dividing the difference between the JND correspondence values corresponding to the minimum gradation value (50) and maximum gradation value (200) by the difference (150) between the maximum gradation value (200) and minimum gradation value (50). The meanings of the portions of Formula 1 are as follows.

j(Lmax)−j(Lmin)

The difference between the JND correspondence value $j\_P_{200}$ corresponding to the maximum gradation value (200) and the JND correspondence value $j\_P_{50}$ corresponding to the minimum gradation value (50) is calculated.

/(Phmax−Phmin)

Figure 12:
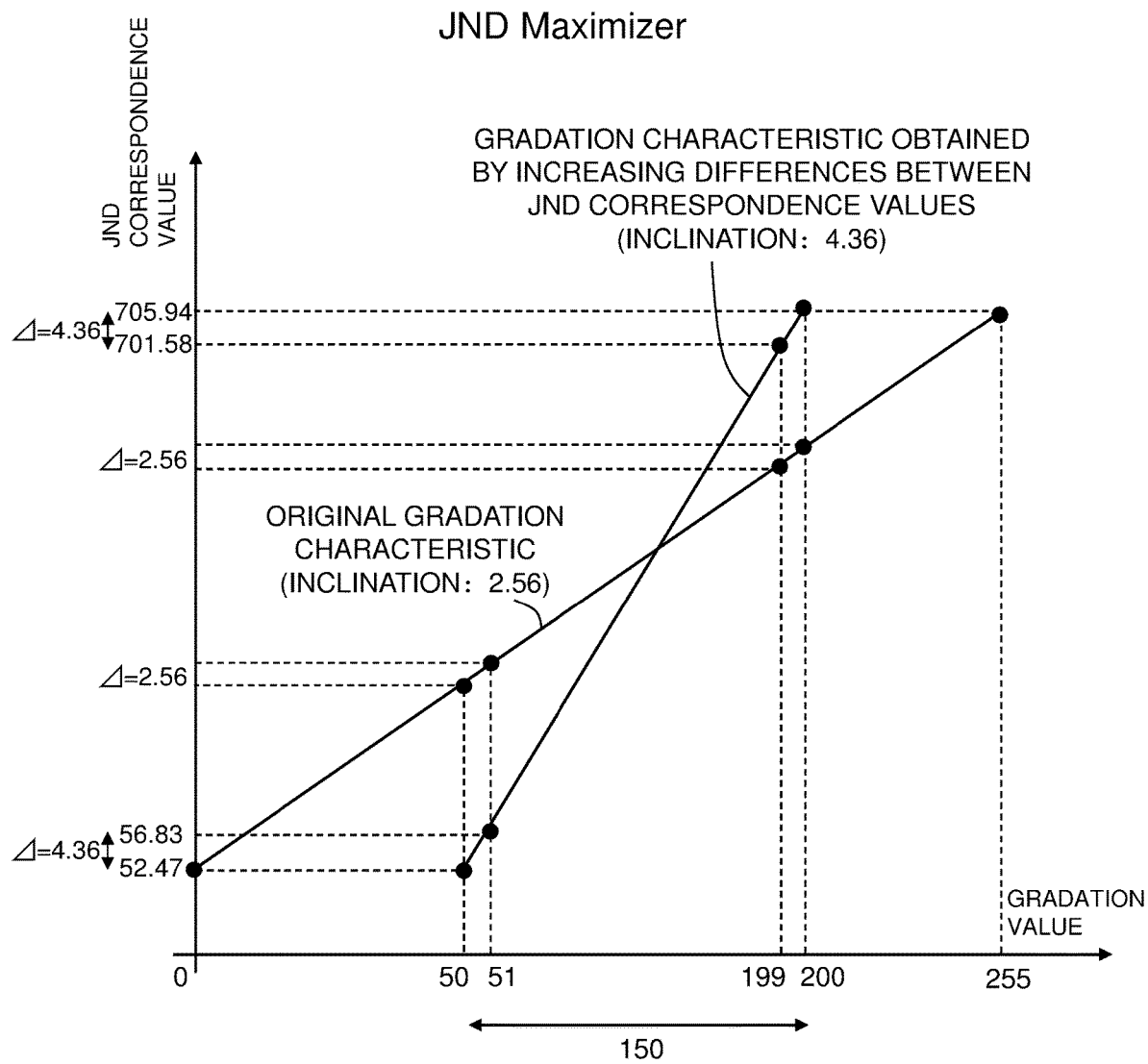
FIG. 12 is a schematic diagram showing the relationship between the gradation value and JND correspondence value before and after the JND maximizer is performed.

The above difference between the JND correspondence values j_Pn is divided by (the number of gradation values included in the gradation range from the minimum gradation value (50) to the maximum gradation value (200)−1). Thus, the "inclination" of a linear function representing the correspondences between the gradation values Pn and JND correspondence values j_Pn is obtained (see FIG. 12). Since the "inclination" is a constant as shown in FIG. 12, the increased differences between the JND correspondence values j_Pn corresponding to each of the gradation values Pn are also constant.

×(Pn−Phmin)

By multiplying by the difference between the predetermined gradation value Pn and minimum gradation value (50), the amount of increase in the JND correspondence value j_Pn corresponding to the predetermined gradation value Pn compared to the JND correspondence value $j\_P_{50}$ corresponding to the minimum gradation value (50) is obtained.

+j(Lmin)

The JND correspondence value $j\_P_{50}$ (an intercept of the linear function) corresponding to the minimum gradation value (50) is added.

Formula 1 will be described below using specific numerical values. For the JND correspondence values j_Pn, see FIG. 4. Note that the JND correspondence values j_Pn in FIG. 4 are rounded down to one decimal place.

$$j\_Pn = (j(L_{255}) - j(L_0))/(P_{200} - P_{50}) \times (Pn - P_{50}) + j(L_0)$$

$$= (705.94 - 52.47)/(200 - 50) \times (Pn - 50) + 52.47$$

$$= 4.36 \times (Pn - 50) + 52.47$$

By repeating this process in the gradation range in which Pn is 50 to 200, the JND correspondence values j_Pn corresponding to the gradation values Pn included in the gradation range from the minimum gradation value (50) to the maximum gradation value (200) are calculated.

As shown in FIG. 12, the first gradation characteristic that is yet to be subjected to the JND maximizer (see FIG. 4) is a linear function that has an inclination of 2.56 and in which the minimum JND correspondence value (52.47) corresponds to the gradation value of 0 and the maximum JND correspondence value (705.94) corresponds to the gradation value of 255. By performing the JND maximizer, the first gradation characteristic becomes a linear function that has an inclination of 4.36 and in which the minimum JND correspondence value (52.47) corresponds to the gradation value of 50 and the maximum JND correspondence value (705.94) corresponds to the gradation value of 200. In other words, in the first gradation characteristic, the JND correspondence values of 52.47 to 705.94 are assigned to the gradation values of 0 to 255 (256 gradations). By performing the JND maximizer, the JND correspondence values of 52.47 to 705.94 are assigned to the gradation values of 50 to 200. Thus, the differences between the JND correspondence values corresponding to the adjacent gradation values are increased from 2.56 to 4.36.

Then, in S3, the target luminances Lt(j_Pn) are identified using Formula 2.

$$Lt(j\_Pn) = 10^x \quad \text{[Formula 2]}$$

(Pn represents an integer in the gradation range from Phmin to Phmax.)

x in Formula 2 represents the right side of Formula 3 below.

JND INDEX → luminance [Formula 3]

$$\log_{10} L(j) = \frac{a + c \cdot \mathrm{Ln}(j) + e \cdot (\mathrm{Ln}(j))^2 + g \cdot (\mathrm{Ln}(j))^3 + m \cdot (\mathrm{Ln}(j))^4}{1 + b \cdot \mathrm{Ln}(j) + d \cdot (\mathrm{Ln}(j))^2 + f \cdot (\mathrm{Ln}(j))^3 + h \cdot (\mathrm{Ln}(j))^4 + k \cdot (\mathrm{Ln}(j))^5}$$

$j = 1 \sim 1023$
$a = -1.3011877, b = -2.5840191E - 2, c = 8.0242636E - 2, d = -1.0320229E - 1$
$e = 1.3646699E - 1, f = 2.8745620E - 2, g = -2.5468404E - 2,$
$h = -3.1978977E - 3\ k = 1.2992634E - 4, m = 1.3635334E - 3$ This is a formula based on the retinex theory, and the target luminances Lt(j_Pn) can be identified as functions of the JND correspondence values j_Pn. In other words, the target luminances Lt(j_Pn) and JND correspondence values j_Pn correspond to each other one-to-one. By calculating the JND correspondence values j_Pn in the gradation range from the minimum gradation value (50) to the maximum gradation value (200), the target luminances Lt(j_Pn) corresponding thereto can be set.

By performing the JND maximizer as described above, display characteristics of the display 4 are changed as follows.
Before JND maximizer
  Display luminance range: 6.46 to 190.18 cd/m²
  Display contrast: 29 (=190.18/6.46)
  Differences between JND correspondence values: 2.56 (see FIG. 4)
After JND maximizer
  Display luminance range: 0.6 to 500 cd/m²
  Display contrast: 833 (=500/0.6)
  Differences between JND correspondence values: 4.36 [=(705.94−52.47)/(200−50)]

4-2. Process Flow

The process flow of the process of the JND maximizer will be described with reference to FIG. 7.

Figure 7:
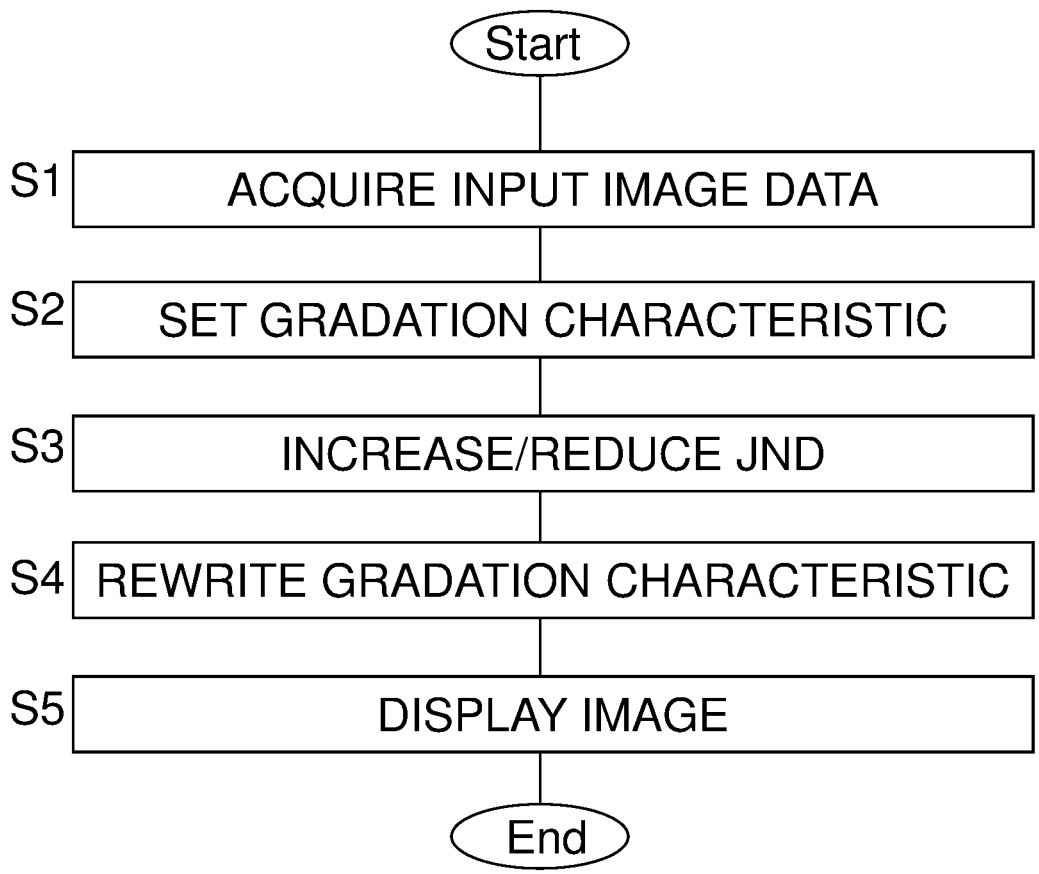
FIG. 7 is a flowchart showing a process performed by the display system 100 according to a second aspect of the present invention.

As shown in FIG. 7, first, in S1, the display system 100 acquires the input image data. At this time, the input image gradation acquisition unit 11 acquires the minimum gradation value and maximum gradation value of the input image data.

Then, in S2, the gradation characteristic setter 12 acquires the gradation characteristic table (first gradation characteristic) stored in the storage unit 2 and sets it on the display 4.

Then, in S3, the gradation characteristic converter 13 increases the JND correspondence values in the gradation range from the minimum gradation value (50) to the maximum gradation value (200) using the above Formula 1. At this time, the increased differences become constant (=4.26). In the present embodiment, the luminance (500 cd/m²) corresponding to $P_{255}$ in the first gradation characteristic is set as the luminance (500 cd/m²) corresponding to $P_{200}$ in the second gradation characteristic. Also, the luminance (0.6 cd/m²) corresponding to $P_0$ in the first gradation characteristic is set as the luminance (0.6 cd/m²) corresponding to $P_{50}$ in the second gradation characteristic. Thus, the minimum luminance of the first gradation characteristic is set on the minimum gradation value (50), and the maximum luminance of the first gradation characteristic is set on the maximum gradation value (200). This is the JND maximizer.

In the present embodiment, the JND maximizer may be performed when one action is performed on the operation unit 3. Also, when one action is performed on the operation unit 3, the difference change process may be performed such that the minimum luminance corresponding to the first gradation characteristic is set on the smaller of any two gradation values of the input image data and the maximum luminance corresponding to the first gradation characteristic is set on the larger of the two gradation values.

Then, in S4, the gradation characteristic rewriter 16 rewrites the first gradation characteristic stored in the storage unit 2 into the second gradation characteristic. While the process performed by the gradation characteristic rewriter 16 is described as S4 for explanation, rewriting of the gradation characteristic may be performed simultaneously with S3.

Finally, in S5, the display 4 displays the input image data as an image with the luminances corresponding to the second gradation characteristic (the luminances corresponding to the gradation values in the gradation range from the minimum gradation value (50) to the maximum gradation value (200) obtained using the above Formula 2).

As described above, by performing he JND maximizer (difference change process), the differences between the JND correspondence values corresponding to each gradation value are increased to the maximum extent possible, and the increased differences become constant. Thus, the display state can be easily controlled so as to be easy for the user to see.

5. JND Enhancer (1) Difference change process not accompanied by gradation/luminance range control The JND enhancer not accompanied by luminance/gradation range control (shift process) will be described below with reference to FIGS. 13 and 14.

Figure 13:
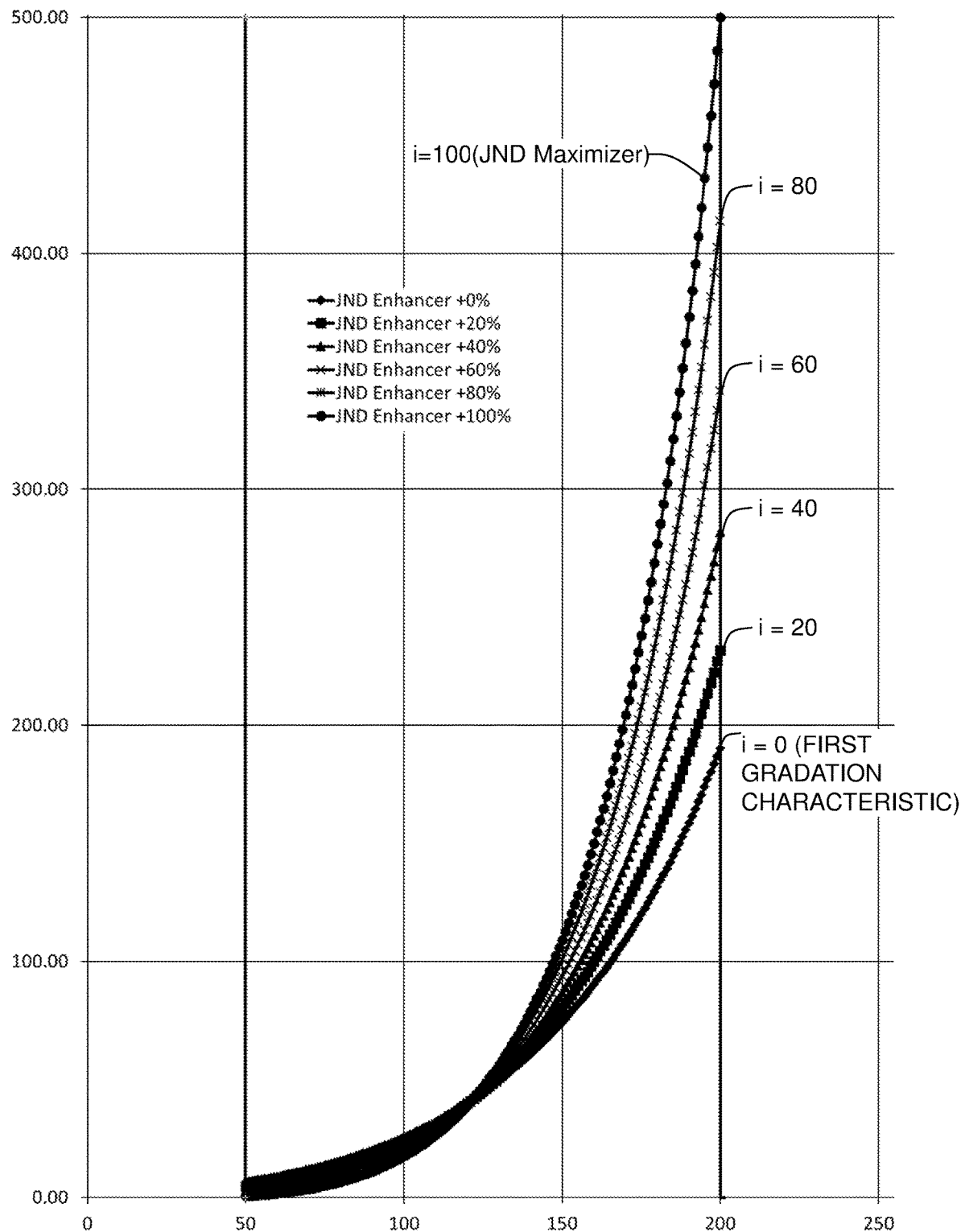
FIG. 13 is a graph showing gradation characteristics obtained by increasing the differences between the JND correspondence values corresponding to each gradation value by the JND enhancer [(1) not accompanied by gradation/luminance range control] and collectively shows gradation characteristics obtained when the variable resolution imax is 0, 20, 40, 60, 80, or 100% (the same hereafter).

First, second gradation characteristics obtained by performing the JND enhancer will be described with reference to FIG. 13. As shown in FIG. 13, by performing the JND enhancer, there are obtained second gradation characteristics having higher luminances than those of the first gradation characteristic in a higher gradation range than the gradation value of the intersection of the first gradation characteristic and each second gradation characteristic in the gradation range from the minimum gradation value (50) to the maximum gradation value (200). In the JND enhancer, the indicator 14 is configured to be able to continuously change the degree of increase in the JND correspondence value. The indicator 14 may be configured to be able to indicate the degree of increase or reduction and then to further indicate a predetermined value as the degree of increase or reduction. FIG. 13 shows examples in which the degree of increase is 0, 20, 40, 60, 80, or 100%. In FIG. 13, 0% represents the first gradation characteristic (see FIG. 5), and 100% represents the second gradation characteristic obtained by performing the JND maximizer (see FIG. 11). This JND enhancer calculation process will be described below. Note that a table shown in FIG. 10 is similar to that of the JND maximizer and therefore will not be described. The same applies to all the functions below.

In the present embodiment, the JND correspondence values j_Pn are calculated using Formula 4 below.

$$j\_Pn = ((j(Lmax) - j(Lmin))/255 + \qquad [\text{Formula 4}]$$
$$(((j(Lmax) - j(Lmin))/(Phmax - Phmin) -$$
$$(j(Lmax) - j(Lmin))/255)) *$$
$$(i/i\text{max})) * (Pn - Phmin) +$$
$$j(L\_Phmin) - (j(L\_Phmin) - j(Lmin)) *$$
$$(i/i\text{max})$$

(Pn represents an integer in the gradation range from Phmin to Phmax.)

The parameters in Formula 4 are as follows.

imax (%): the resolution of the JND enhancer i (%): control value j(L_Phmin): the JND correspondence value of the original gradation characteristic corresponding to the minimum gradation value i (control value) is a value corresponding to 0, 20, 40, 60, 80, or 100% described above. The other parameters are the same as those of Formula 1 and therefore will not be described.

In FIG. 13, the parameters take the following values.

j(Lmax): 705.94
j(Lmin): 52.47
Phmax: 200
Phmin: 50
imax: 100%
i: 0, 20, 40, 60, 80, or 100% j(L_Phmin): 180.60 (the JND correspondence value corresponding to the gradation value 50 in the original gradation characteristic)

The JND correspondence values j_Pn corresponding to the gradation values Pn in the gradation range from the minimum gradation value (50) to the maximum gradation value (200) defined by the second gradation characteristic are calculated using Formula 4. At this time, the differences between the JND correspondence values corresponding to each gradation value are increased and the increased differences are constant. FIG. 13 is a graph obtained by plotting the calculated JND correspondence values j_Pn. In the present embodiment, a luminance corresponding to a predetermined gradation value (a gradation value corresponding to the intersection of the first gradation characteristic and each second gradation characteristic in the cases in which i is 0, 20, 40, 60, 80, or 100) is used as a reference, and luminances corresponding to the gradation values other than the predetermined gradation value are set such that the differences between the JND correspondence values corresponding to each gradation value are increased and the increased differences become constant.

Figure 14:
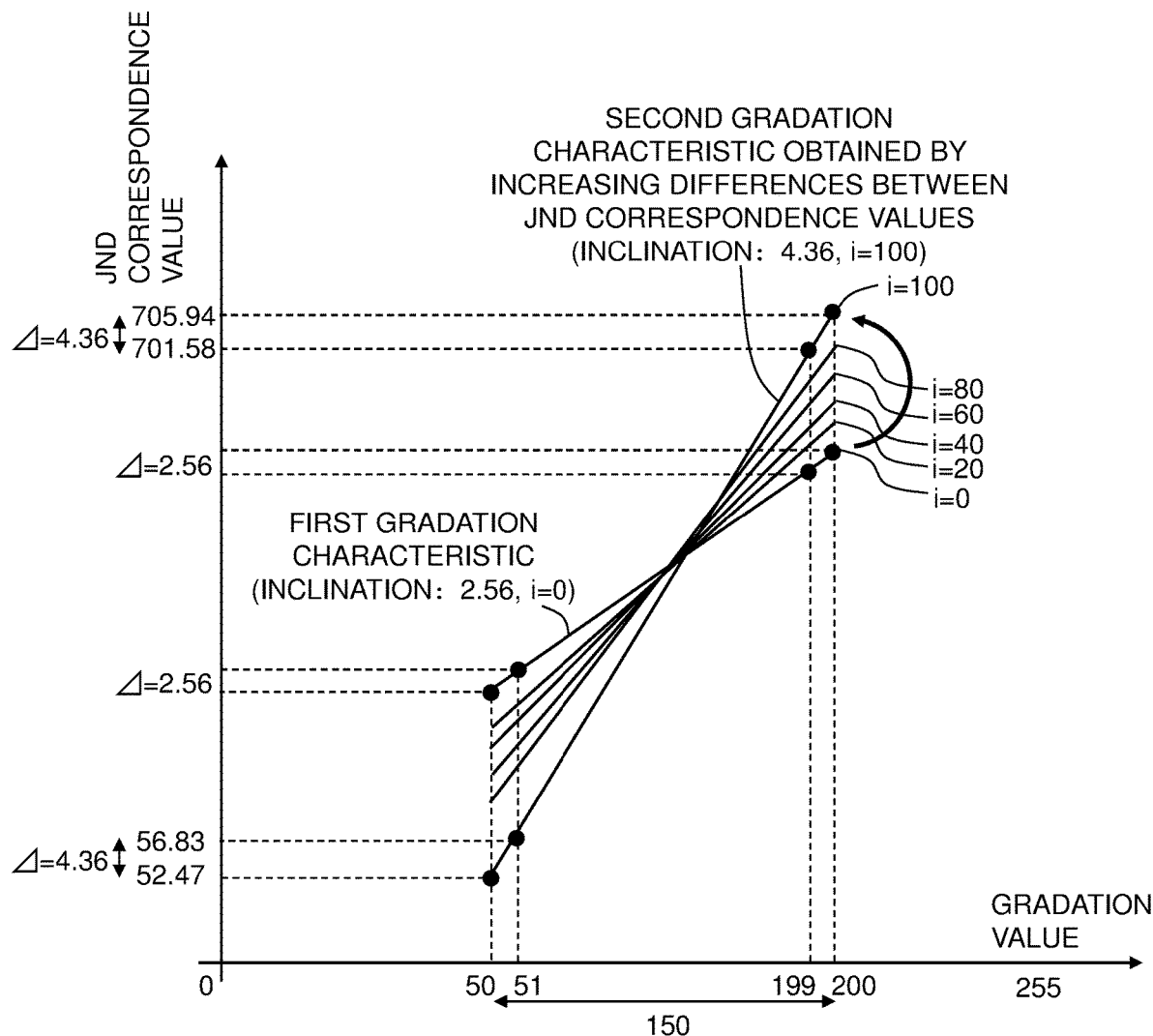
FIG. 14 is a schematic diagram showing the relationship between the gradation value and JND correspondence value obtained by performing the JND enhancer [(1) not accompanied by gradation/luminance range control].

At this time, as shown in FIG. 14, the relationship between the gradation value and JND correspondence value varies among the examples of i=0 to 100. Note that in an example in FIG. 14, the intersections of the cases of i=0 to 100 do not necessarily match each other. As shown in FIG. 14, for example, the JND correspondence value of i=100 is higher that of i=0 on the high gradation-side of the intersection. In other words, the luminance of i=100 is higher than that of i=0 on the high graduation-side of the intersection (see FIGS. 4 and 13). On the other hand, the JND correspondence value of i=100 is lower than that of i=0 on the low gradation-side of the intersection. In other words, the luminance of i=100 is lower than that of i=0 on the low gradation-side of the intersection (see FIGS. 4 and 13).

Also, by continuously changing i from 0 to 100, the differences between the JND correspondence values corresponding to each gradation value are continuously changed from 2.56 (i=0) to 4.36 (i=100). For example, if the operation unit 3 is a mouse, the user may continuously increase the value of i by sliding the mouse upward. At this time, the resolution of the differences between the JND correspondence values becomes 0.018 [=(4.36−2.56)/100]. The indicator 14 may be configured to indicate the value of i (e.g., i=20) and then to further indicate a predetermined value (e.g., i=40).

This process corresponds to S3 in FIG. 7. S1, S2, S4, and S5 are similar to those of the JND maximizer and therefore will not be described.

As seen above, by performing the JND enhancer, the differences between the JND correspondence values corresponding to each gradation value can be increased continuously or discontinuously, and the increased differences become constant. Thus, the display state can be easily controlled so as to be easy for the user to see.

6. JND Suppressor (2) Difference change process not accompanied by gradation/luminance range control The JND suppressor not accompanied by luminance/gradation range control (shift process) will be described below with reference to FIGS. 15 and 16. In the present embodiment, the JND suppressor is a difference change process of reducing the differences between the JND correspondence values corresponding to each gradation value in the first gradation characteristic.

Figure 15:
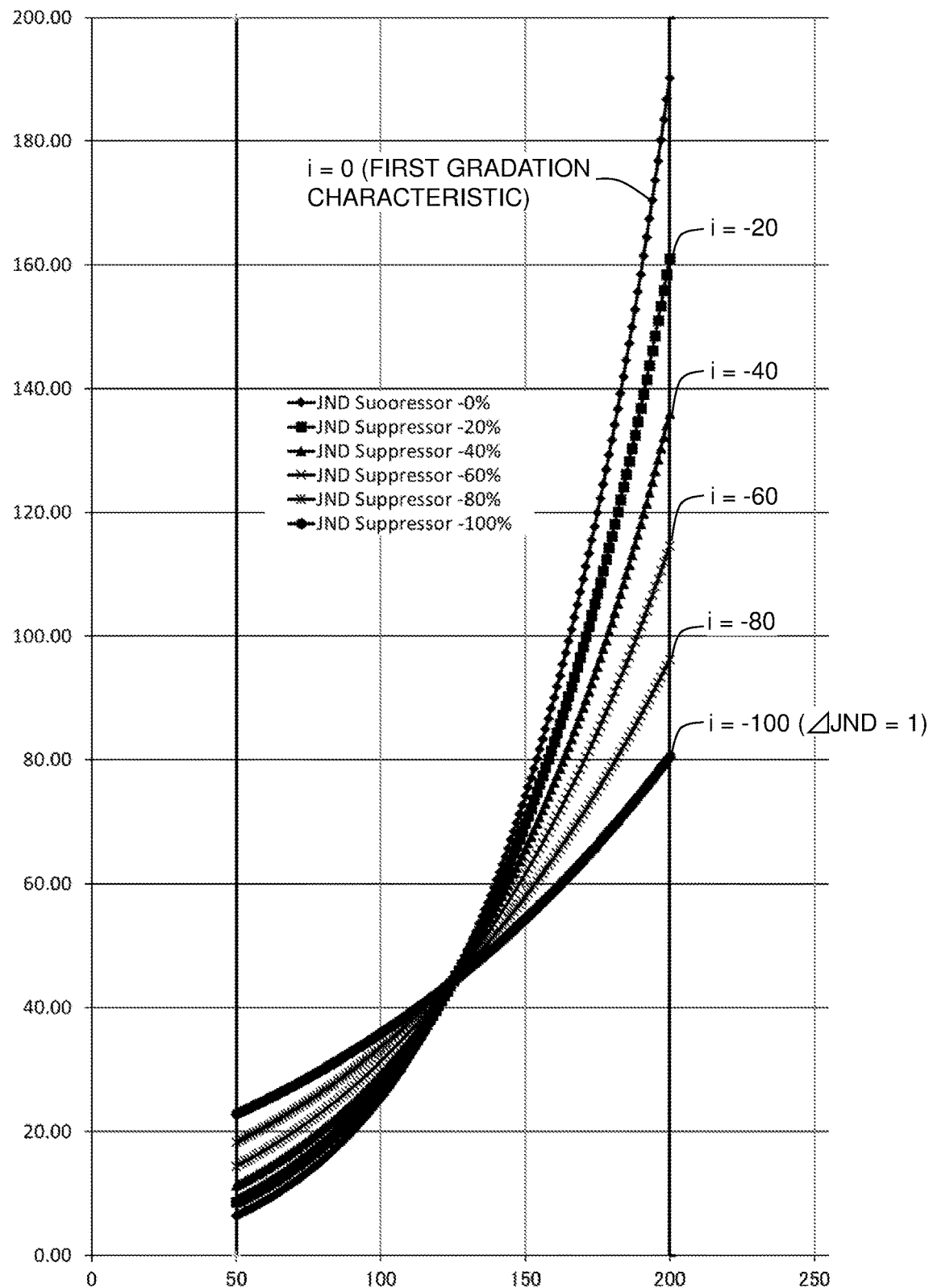
FIG. 15 is a graph showing gradation characteristics obtained by reducing the differences between the JND correspondence values corresponding to each gradation value by the JND suppressor [(2) not accompanied by gradation/luminance range control] and collectively shows gradation characteristics obtained when the variable resolution i is 0, −20, −40, −60, −80, or −100% (the same hereafter).

First, second gradation characteristics obtained by performing the JND suppressor will be described with reference to FIG. 15. As shown in FIG. 15, there are obtained second gradation characteristics having lower luminances than those of the first gradation characteristic in a higher gradation range than the gradation value of the intersection of the first gradation characteristic and each second gradation characteristic in the gradation range from the minimum gradation value (50) to the maximum gradation value (200). In the JND suppressor, the degree of reduction in the JND correspondence value can be changed continuously. FIG. 15 shows examples in which the degree of reduction is 0, −20, −40, −60, −80, or −100%. In FIG. 15, 0% represents the first gradation characteristic (see FIG. 5), and −100% represents the second gradation characteristic that is a display state in which the differences between the JND correspondence values corresponding to each gradation value are 1. If the differences between the JND correspondence values corresponding to each gradation value are less than 1, the observer cannot recognize changes in the luminance. For this reason, the case in which the differences are 1 is defined as the upper limit of reduction (−100%) in the differences between JND correspondence values. This JND suppressor calculation process will be described below.

In the present embodiment, the JND correspondence values j_Pn are calculated using Formula 5 below.

$$j\_Pn = ((j(Lmax) - j(Lmin))/255 + \\ (1 - (j(Lmax) - j(Lmin))/255) * (i/imin)) * \\ (Pn - Phmin) + j(L\_Phmin) + \\ ((j(L\_Phmax) - j(L\_Phmin)) - 1 * (Phmax - Phmin)) * \\ (i/imin)/2$$

[Formula 5]

(Pn represents an integer in the gradation range from Phmin to Phmax.)

The parameters in Formula 5 are defined as follows.
imin (%): the resolution of the JND suppressor
i (%): control value In an example in FIG. 15, imin is −100, and i is 0, −20, −40, −60, −80, or −100%. The other parameters are the same as those in FIG. 13 and therefore will not be described.

The JND correspondence values j_Pn corresponding to the gradation values Pn in the gradation range from the minimum gradation value (50) to the maximum gradation value (200) are calculated using Formula 5. At this time, the differences between the JND correspondence values corresponding to each gradation value are reduced and the reduced differences become constant. FIG. 15 is a graph obtained by plotting the calculated JND correspondence values j_Pn. In the present embodiment, a luminance corresponding to a predetermined gradation value (a gradation value corresponding to the intersection of the first gradation characteristic and each second gradation characteristic in the cases in which i is 0, −20, −40, −60, −80, or −100%) is used as a reference, and luminances corresponding to the gradation values other than the predetermined gradation value are set such that the differences between the JND correspondence values corresponding to each gradation value are reduced and the reduced differences become constant.

Figure 16:
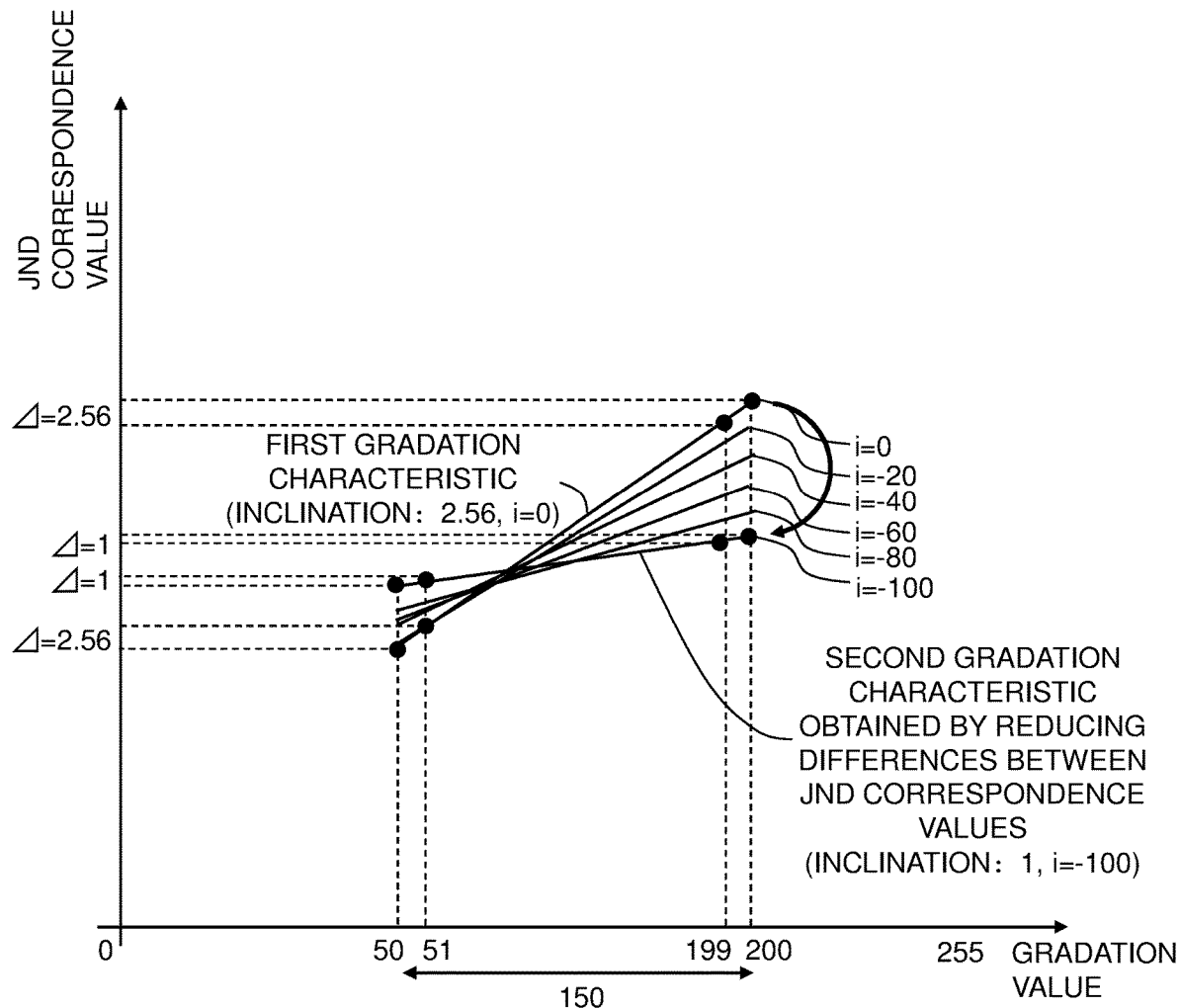
FIG. 16 is a schematic diagram showing the relationship between the gradation value and JND correspondence value obtained by performing the JND suppressor [(2) not accompanied by gradation/luminance range control].

At this time, as shown in FIG. 16, the relationship between the gradation value and JND correspondence value varies among the examples of i=0 to −100. Note that in an example in FIG. 16, the intersections of the cases of i=0 to −100 do not necessarily match each other. As shown in FIG. 16, for example, the JND correspondence value of i=−100 is higher than that of i=0 on the high gradation-side of the intersection. In other words, the luminance of i=−100 is lower than that of i=0 on the high graduation-side of the intersection (see FIGS. 4 and 15). On the other hand, the JND correspondence value of i=−100 is higher than that of i=0 on the low gradation-side of the intersection. In other words, the luminance of i=−100 is higher than that of i=0 on the low gradation-side of the intersection (see FIGS. 4 and 15).

Also, by continuously changing i from 0 to −100, the differences between the JND correspondence values corresponding to each gradation value are continuously changed from 2.56 (i=0) to 1 (i=−100). For example, if the operation unit 3 is a mouse, the user may continuously reduce the value of i by sliding the mouse downward. At this time, the resolution of the differences between the JND correspondence values becomes 0.0156 [=(2.56−1)/100]. The indicator 14 may be configured to indicate the value of i (e.g., i=20) and then to further indicate a predetermined value (e.g., i=40).

This process corresponds to S3 in FIG. 7. S1, S2, S4, and S5 are similar to those of the JND maximizer and therefore will not be described.

As seen above, by performing the JND suppressor, the differences between the JND correspondence values corresponding to each gradation value are reduced continuously or discontinuously. Thus, the granularity (noisiness) of the image can be reduced. Also, the reduced differences become constant. Thus, the display state can be easily controlled so as to be easy for the user to see.

7. JND Enhancer (3) Lmax is fixed (shift process +difference change process)

Figure 17:
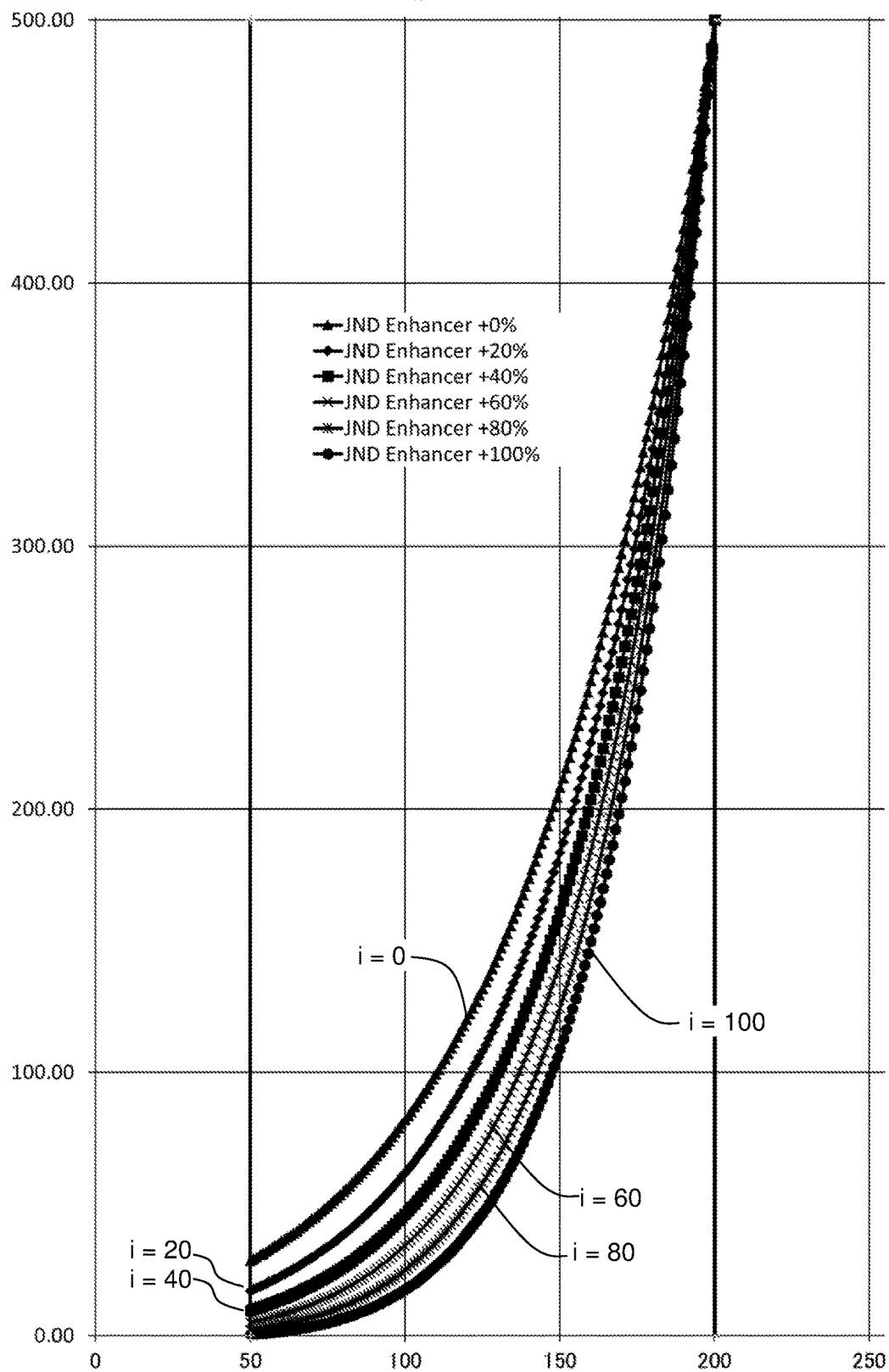
FIG. 17 is a graph showing gradation characteristics obtained by increasing the differences between the JND correspondence values corresponding to each gradation value by the JND enhancer [(3) Lmax is fixed].

The JND enhancer with Lmax fixed will be described below with reference to FIGS. 17 and 18. This is a process of performing the JND enhancer (difference change process) after shifting the luminance/gradation range to Lmax toward the high luminance-side (after performing a maximum shift toward the low gradation value-side in the shift process).

First, second gradation characteristics obtained by performing the JND enhancer will be described with reference to FIG. 17. As shown in FIG. 17, by performing the maximum shift toward the low gradation value-side and then performing the JND enhancer on the obtained second gradation characteristic (i=0) with the maximum luminance (Lmax) fixed, there are obtained second gradation characteristics having lower luminances than those of the second gradation characteristic (i=0) in the gradation range from the minimum gradation value (50) to the maximum gradation value (200). In the JND enhancer, the degree of increase in the JND correspondence value can be changed continuously. FIG. 17 shows examples in which the degree of increase is 0, 20, 40, 60, 80, or 100%. In FIG. 17, 0% represents the second gradation characteristic obtained by performing the maximum shift toward the low gradation value-side (see FIG. 9), and 100% represents the second gradation characteristic obtained by performing the maximum shift toward the low gradation value-side and then performing the JND maximizer. In the present embodiment, the gradation characteristic that is yet to be subjected to the maximum shift toward the low gradation value-side corresponds to the first gradation characteristic. This JND enhancer calculation process will be described below.

In the present embodiment, the JND correspondence values j_Pn are calculated using Formula 6 below.

$$j\_Pn = ((j(L\max) - j(L\min))/255 + \qquad \text{[Formula 6]}$$
$$(((j(L\max) - j(L\min))/(Ph\max - Ph\min) -$$
$$(j(L\max) - j(L\min))/255)) * (i/i\max)) *$$
$$(Pn - Ph\min) + j(L\_(255 - P\max - P\min)) -$$
$$(j(L\_(255 - P\max - P\min)) - j(L\min)) * (i/i\max)$$

(Pn represents an integer in the gradation range from Phmin to Phmax.)

The JND correspondence values j_Pn corresponding to the gradation values Pn in the gradation range from the minimum gradation value (50) to the maximum gradation value (200) are calculated using Formula 6. At this time, the differences between the JND correspondence values corresponding to each gradation value are increased and the increased differences become constant. FIG. 17 is a graph obtained by plotting the calculated JND correspondence values j_Pn. In the present embodiment, a luminance corresponding to a predetermined gradation value [maximum gradation value (200)] is used as a reference, and luminances corresponding to the gradation values other than the predetermined gradation value are set such that the differences between the JND correspondence values corresponding to each gradation value are increased and the increased differences become constant.

Figure 18:
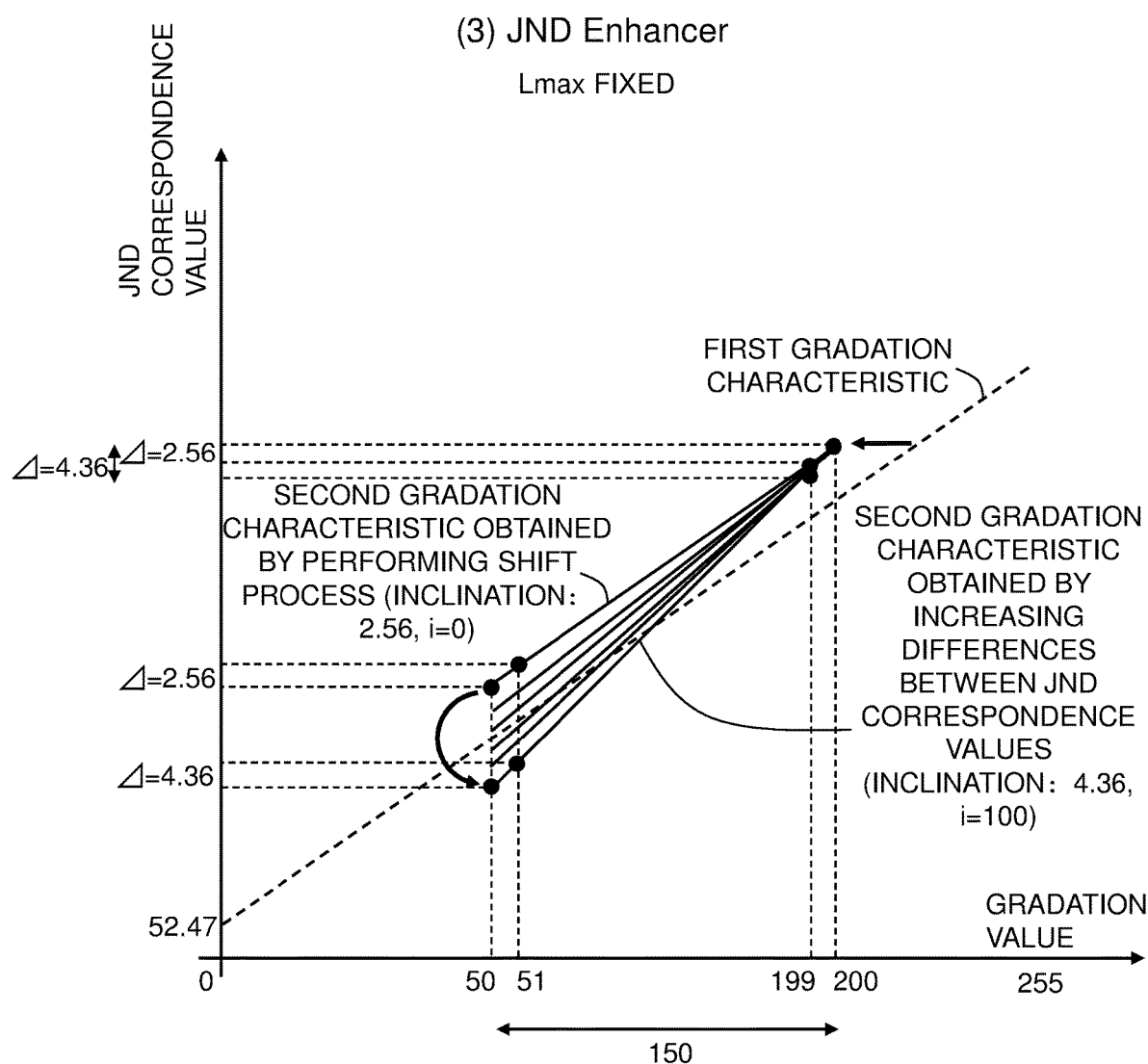
FIG. 18 is a schematic diagram showing the relationship between the gradation value and JND correspondence value obtained by performing the JND enhancer [(3) Lmax is fixed].

At this time, as shown in FIG. 18, the relationship between the gradation value and JND correspondence value varies among the examples of i=0 to 100 continuously or discontinuously. This is a process of shifting the first gradation characteristic to Lmax toward the high luminance-side (performing the maximum shift that is a shift process of shifting the first gradation characteristic toward the low gradation value-side to the maximum extent) and then changing the inclination of the graph with the maximum JND correspondence value corresponding to Lmax fixed. For example, as shown in FIG. 18, the JND correspondence value of i=100 is lower than that of i=0 in a lower gradation range than the maximum gradation value (200). In other words, the luminance of i=100 is lower than that of i=0 in the lower gradation range than the maximum gradation value (200) (see FIGS. 4 and 17).

Also, by continuously changing i from 0 to 100, the differences between the JND correspondence values corresponding to each gradation value are continuously changed from 2.56 (i=0) to 4.36 (i=100). For example, if the operation unit 3 is a mouse, the user may continuously increase the value of i by sliding the mouse upward. At this time, the resolution of the differences between the JND correspondence values becomes 0.018 [=(4.36−2.56)/100]. The indicator 14 may be configured to indicate the value of i (e.g., i=20) and then to further indicate a predetermined value (e.g., i=40).

This process corresponds to S3 in FIG. 7. S1, S2, S4, and S5 are similar to those of the JND maximizer and therefore will not be described.

As seen above, in the present embodiment, the differences between the JND correspondence values corresponding to each gradation value can be increased continuously or discontinuously with the maximum display luminance kept fixed.

8. JND Suppressor (4) Lmax is fixed (shift process+difference change process)

Figure 19:
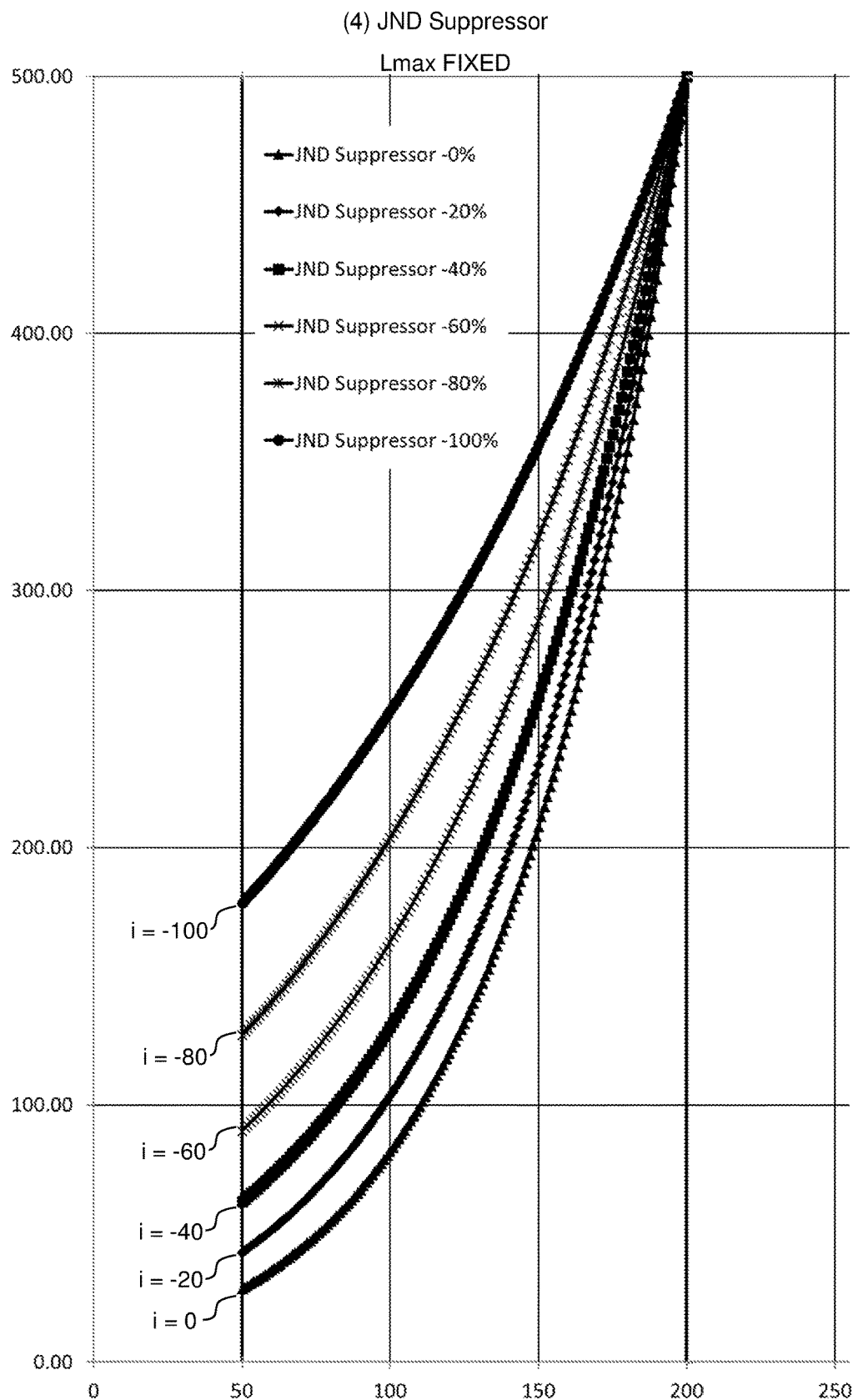
FIG. 19 is a graph showing gradation characteristics obtained by reducing the differences between the JND correspondence values corresponding to each gradation value by the JND suppressor [(4) Lmax is fixed].

The JND suppressor with Lmax fixed will be described with reference to FIGS. 19 and 20. This is a process of shifting the luminance/gradation range to Lmax toward the high luminance-side (performing a maximum shift toward the low gradation value-side in the shift process) and then performing the JND suppressor (difference change process).

First, second gradation characteristics obtained by performing the JND suppressor will be described with reference to FIG. 19. As shown in FIG. 19, by performing the maximum shift toward the low gradation value-side and then performing the JND suppressor on the obtained second gradation characteristic (i=0) with the maximum luminance (Lmax) fixed, there are obtained second gradation characteristics having higher luminances than those of the second gradation characteristic (i=0) in the gradation range from the minimum gradation value (50) to the maximum gradation value (200). In the JND suppressor, the degree of reduction in the JND correspondence value can be changed continuously. FIG. 19 shows examples in which the degree of reduction is 0, −20, −40, −60, −80, or −100%. In FIG. 19, 0% represents the second gradation characteristic obtained by performing the maximum shift toward the low gradation value-side (see FIG. 9), and −100% represents the second gradation characteristic obtained by performing the maximum shift toward the low gradation value-side and then performing the JND suppressor with the maximum degree of reduction (i=−100%). In the present embodiment, the gradation characteristic that has yet to be subjected to the maximum shift toward the low gradation value-side corresponds to the first gradation characteristic. This JND suppressor calculation process will be described below.

In the present embodiment, the JND correspondence values j_Pn are calculated using Formula 7 below.

$$j\_Pn = ((j(L\max) - j(L\min))/255 + \qquad \text{[Formula 7]}$$
$$(1 - (j(L\max) - j(L\min))/255) * (i/i\min)) *$$
$$(Pn - Ph\min) + (j(L\_(255 - P\max - P\min)) +$$
$$((j(L\_P\max) - 1 * (Pn - Ph\min)) -$$
$$j(L\_(255 - P\max - P\min)) * (i/i\min)$$

(Pn represents an integer in the gradation range from Phmin to Phmax.)

More specifically, the JND correspondence values j_Pn corresponding to the gradation values Pn in the gradation range from the minimum gradation value (50) to the maximum gradation value (200) are calculated using Formula 7. At this time, the differences between the JND correspondence values corresponding to each gradation value are reduced, and the reduced differences become constant. FIG. 19 is a graph obtained by plotting the calculated JND correspondence values j_Pn. In the present embodiment, a luminance corresponding to a predetermined gradation value [maximum gradation value (200)] is used as a reference, and luminances corresponding to the gradation values other than the predetermined gradation value are set such that the differences between the JND correspondence values corresponding to each gradation value are reduced and the reduced differences become constant.

Figure 20:
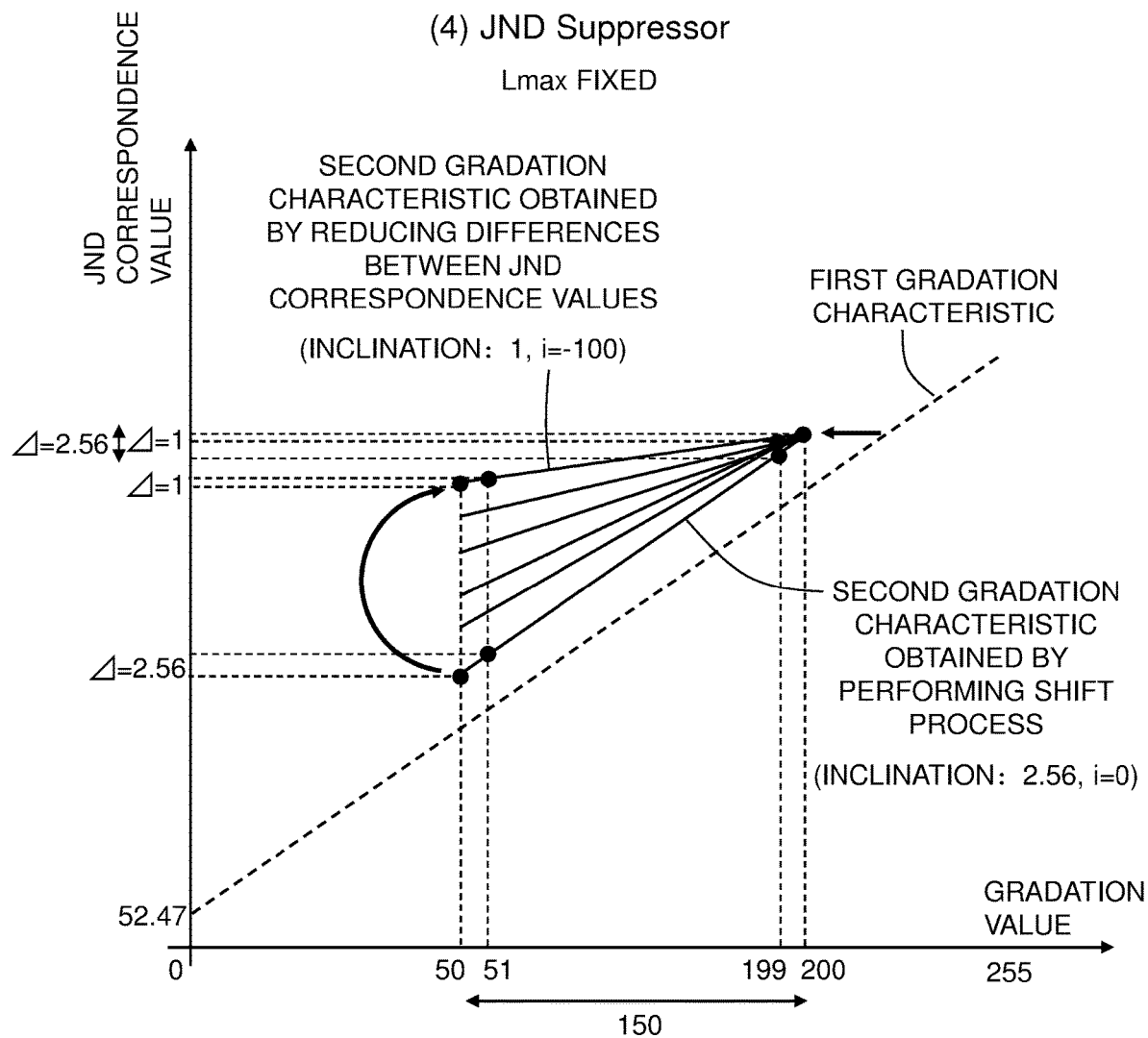
FIG. 20 is a schematic diagram showing the relationship between the gradation value and JND correspondence value obtained by performing the JND suppressor [(4) Lmax is fixed].

At this time, as shown in FIG. 20, the relationship between the gradation value and JND correspondence value varies among the examples of i=0 to −100 continuously or discontinuously. This is a process of shifting the original gradation characteristic to Lmax toward the high luminance-side (the above maximum shift) and then changing the inclination of the graph with the maximum JND correspondence value corresponding to Lmax fixed. For example, as shown in FIG. 20, the JND correspondence value of i=−100 is higher than that of i=0 in a lower gradation range than the maximum gradation value (200). In other words, the luminance of i=−100 is higher than that of i=0 in the lower gradation range than the maximum gradation value (200) (see FIGS. 4 and 19).

Also, by continuously changing i from 0 to −100, the differences between the JND correspondence values corresponding to each gradation value are continuously changed from 2.56 (i=0) to 1 (i=−100). For example, if the operation unit 3 is a mouse, the user may continuously reduce the value of i by sliding the mouse downward. At this time, the resolution of the differences between JND correspondence values becomes 0.0156 [=(2.56−1)/100]. The indicator 14 may be configured to indicate the value of i (e.g., i=−20) and then to further indicate a predetermined value (e.g., i=−40).

This process corresponds to S3 in FIG. 7. S1, S2, S4, and S5 are similar to those of the JND maximizer and therefore will not be described.

As seen above, in the present embodiment, the differences between the JND correspondence values corresponding to each gradation value can be reduced continuously or discontinuously with the maximum display luminance kept fixed.

9. JND Enhancer (5) Lmin is fixed (shift process +difference change process)

Figure 21:
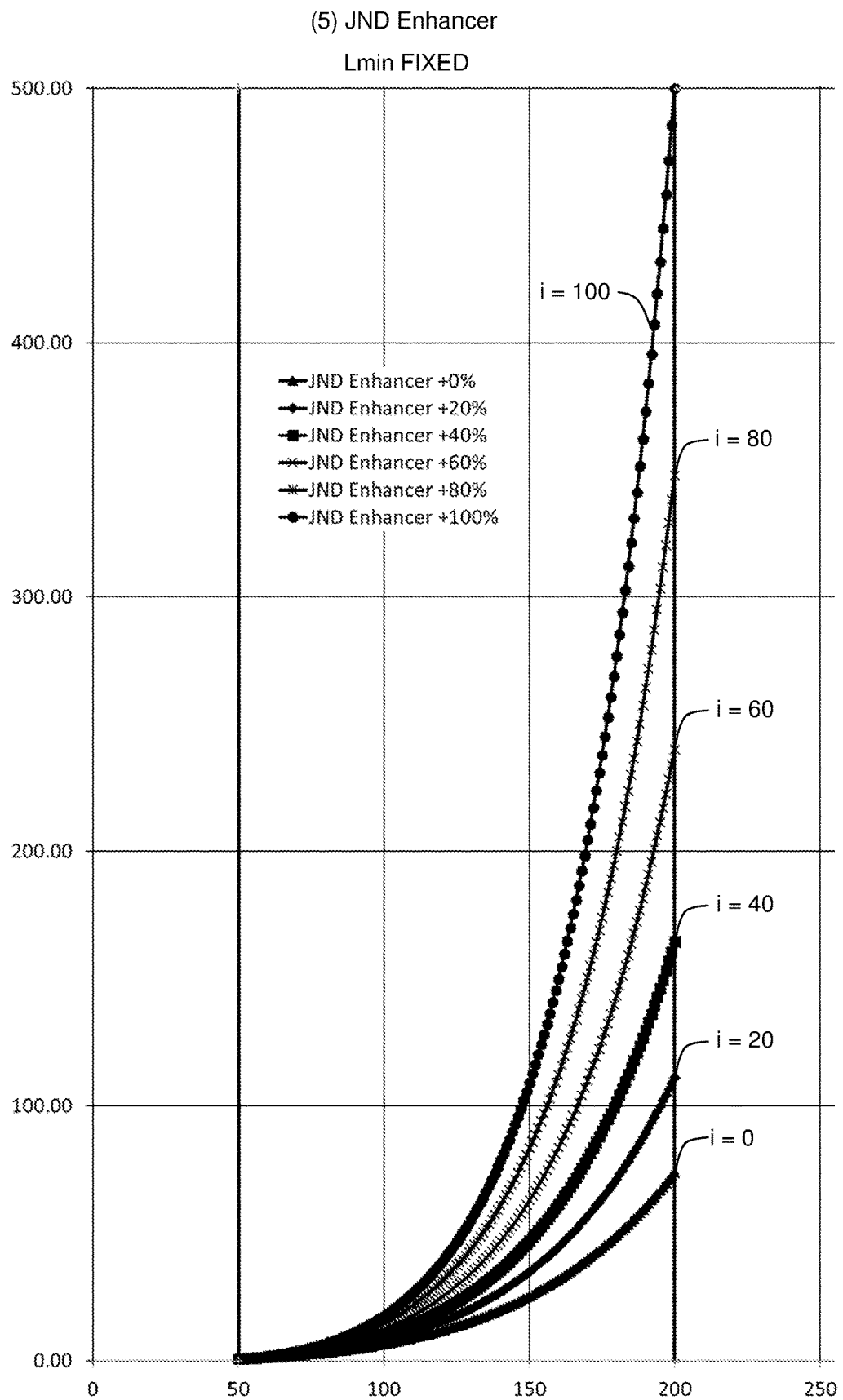
FIG. 21 is a graph showing gradation characteristics obtained by increasing the differences between the JND correspondence values corresponding to each gradation value by the JND enhancer [(5) Lmin is fixed].

The JND enhancer with Lmin fixed will be described below with reference to FIGS. 21 and 22. This is a process of shifting the luminance/gradation range to Lmin toward the low luminance-side (performing a maximum shift toward the high gradation value-side in the shift process) and then performing the JND enhancer (difference change process).

First, second gradation characteristics obtained by performing the JND enhancer will be described with reference to FIG. 21. As shown in FIG. 21, by performing the maximum shift toward the high gradation value-side and then performing the JND enhancer on the obtained second gradation characteristic (i=0) with the minimum luminance (Lmin) fixed, there are obtained second gradation characteristics having higher luminances than those of the second gradation characteristic (i=0) in the gradation range from the minimum gradation value (50) to the maximum gradation value (200). In the JND enhancer, the degree of increase in the JND correspondence value can be changed continuously. FIG. 21 shows examples in which the degree of increase is 0, 20, 40, 60, 80, or 100%. In FIG. 21, 0% represents the second gradation characteristic obtained by performing the maximum shift toward the high gradation value-side (see FIG. 9), and 100% represents the second gradation characteristic obtained by performing the maximum shift toward the high gradation value-side and then performing the JND maximizer. In the present embodiment, the gradation characteristic that is yet to be subjected to the maximum shift toward the high gradation value-side corresponds to the first gradation characteristic. This JND enhancer calculation process will be described below.

In the present embodiment, the JND correspondence values j_Pn are calculated using Formula 8 below.

$$j\_Pn = ((j(Lmax) - j(Lmin))/255 + \quad \text{[Formula 8]}$$
$$(((j(Lmax) - j(Lmin))/(Phmax - Phmin) -$$
$$(j(Lmax) - j(Lmin))/255)) *$$
$$(i/imax)) * (Pn - Phmin) + j(Lmin)$$

(Pn represents an integer in the gradation range from Phmin to Phmax.)

More specifically, the JND correspondence values j_Pn corresponding to the gradation values Pn in the gradation range from the minimum gradation value (50) to the maximum gradation value (200) are calculated using Formula 8. At this time, the differences between the JND correspondence values corresponding to each gradation value are increased and the increased differences become constant. FIG. 21 is a graph obtained by plotting the calculated JND correspondence values j_Pn. In the present embodiment, a luminance corresponding to a predetermined gradation value [minimum gradation value (50)] is used as a reference, and luminances corresponding to the gradation values other than the predetermined gradation value are set such that the differences between the JND correspondence values corresponding to each gradation value are increased and the increased differences become constant.

Figure 22:
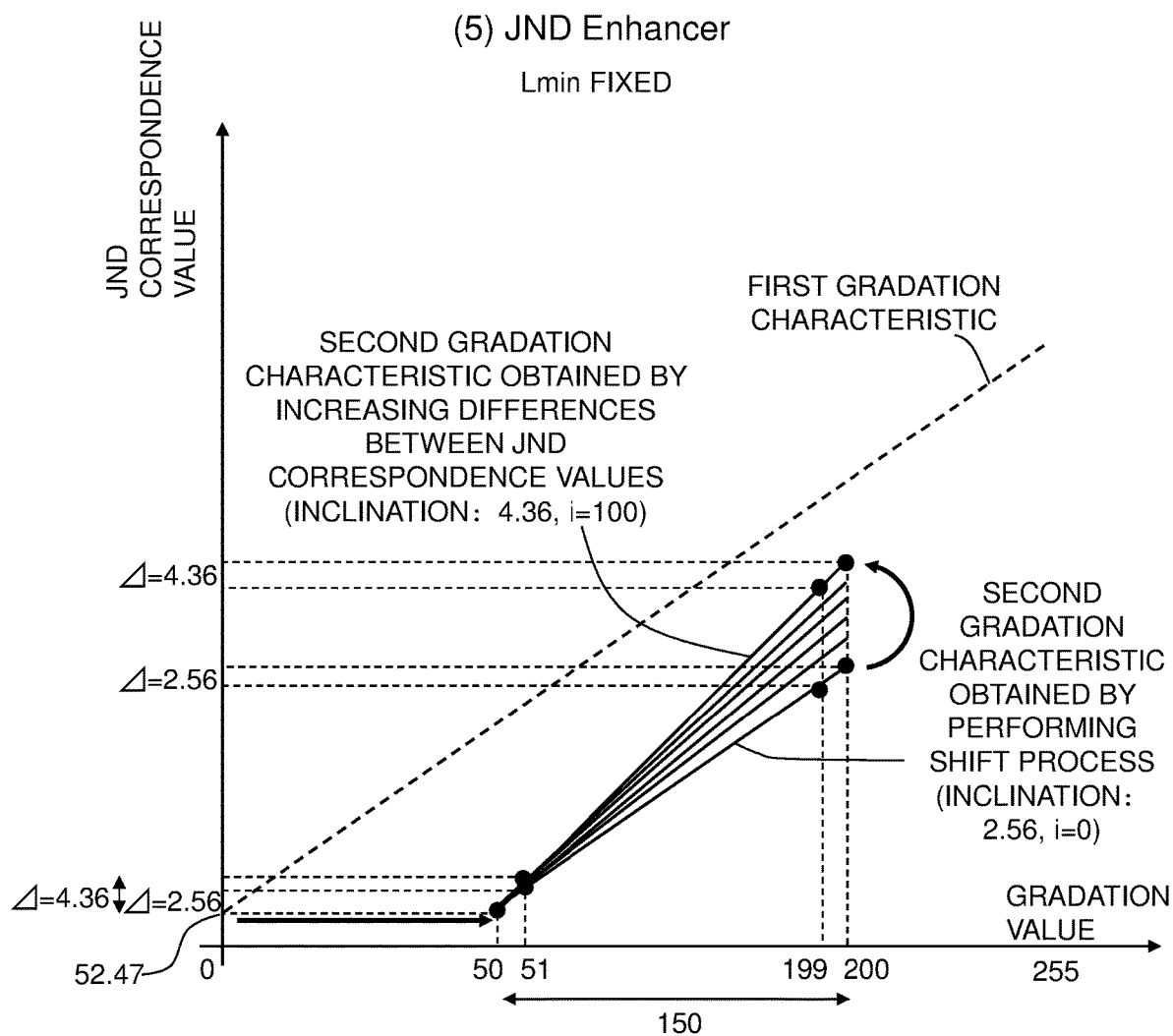
FIG. 22 is a schematic diagram showing the relationship between the gradation value and JND correspondence value obtained by performing the JND enhancer [(5) Lmin is fixed].

At this time, as shown in FIG. 22, the relationship between the gradation value and JND correspondence value varies among the examples of i=0 to 100 continuously or discontinuously. This is a process of shifting the original gradation characteristic to Lmin toward the low luminance-side (performing the maximum shift that is a shift process of shifting the original gradation characteristic toward the high gradation value-side to the maximum extent) and then changing the inclination of the graph with the minimum JND correspondence value corresponding to Lmin fixed. For example, as shown in FIG. 22, the JND correspondence value of i=100 is higher than that of i=0 in a higher gradation range than the minimum gradation value (50). In other words, the luminance of i=100 is higher than that of i=0 in the higher gradation range than the minimum gradation value (50) (see FIGS. 4 and 21).

Also, by continuously changing i from 0 to 100, the differences between the JND correspondence values corresponding to each gradation value are continuously changed from 2.56 (i=0) to 4.36 (i=100). For example, if the operation unit 3 is a mouse, the user may continuously increase the value of i by sliding the mouse upward. At this time, the resolution of the differences between the JND correspondence values becomes 0.018 [=(4.36−2.56)/100]. The indicator 14 may be configured to indicate the value of i (e.g., i=20) and then to further indicate a predetermined value (e.g., i=40).

This process corresponds to S3 in FIG. 7. S1, S2, S4, and S5 are similar to those of the JND maximizer and therefore will not be described.

As seen above, in the present embodiment, the differences between the JND correspondence values corresponding to each gradation value can be increased continuously or discontinuously with the minimum display luminance kept fixed.

10. JND Suppressor (6) Lmin is fixed (shift process +difference change process)

Figure 23:
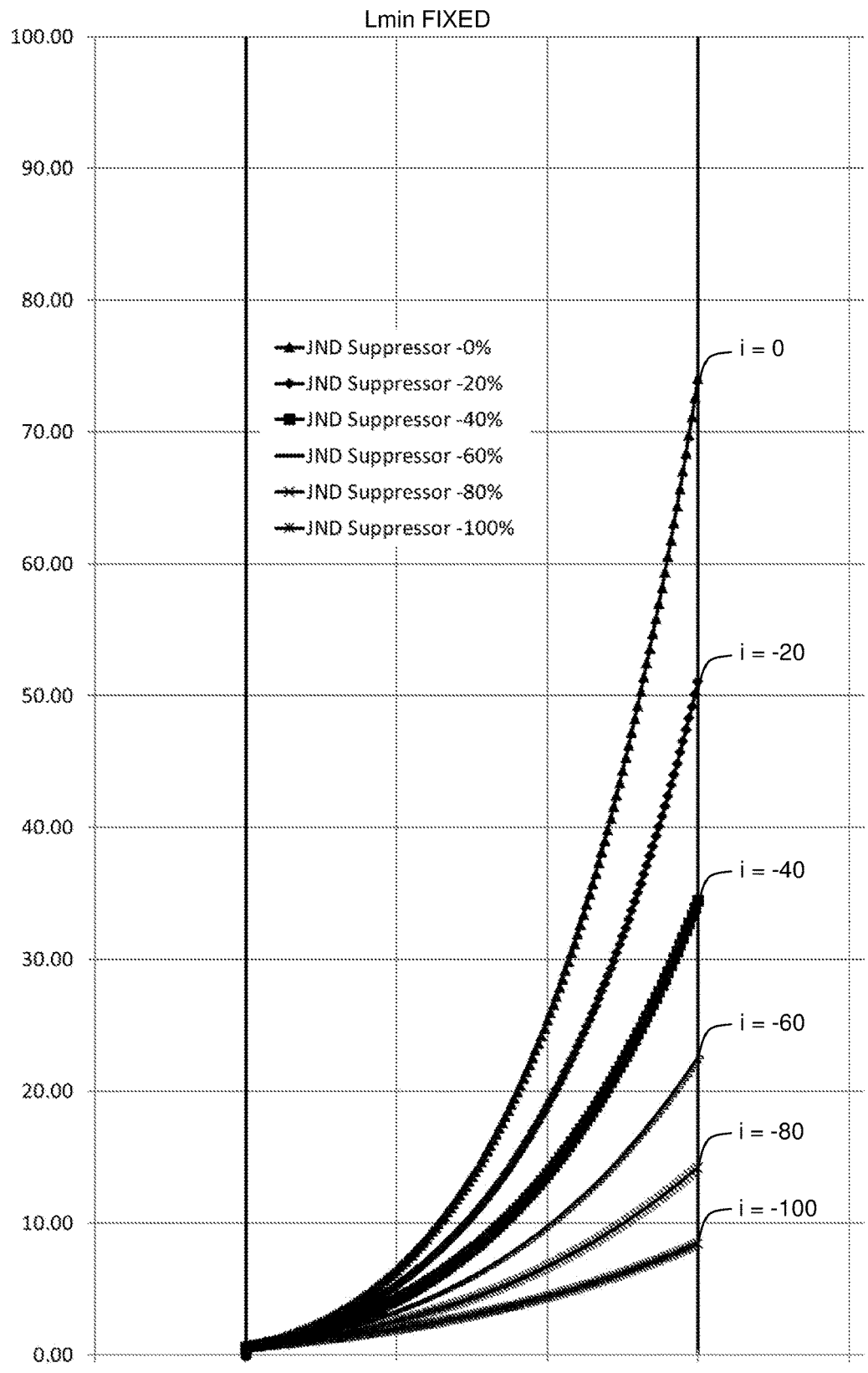
FIG. 23 is a graph showing gradation characteristics obtained by reducing the differences between the JND correspondence values corresponding to each gradation value by the JND suppressor [(6) Lmin is fixed].

The JND suppressor with Lmin fixed will be described with reference to FIGS. 23 and 24. This is a process of shifting the luminance/gradation range to Lmin toward the low luminance-side (performing a maximum shift toward the high gradation value-side in the shift process) and then performing the JND suppressor (difference change process).

First, second gradation characteristics obtained by performing the JND suppressor will be described with reference to FIG. 23. As shown in FIG. 23, by performing the maximum shift toward the high gradation value-side and then performing the JND suppressor on the obtained second gradation characteristic (i=0) with the minimum luminance (Lmin) fixed, there are obtained second gradation characteristics having lower luminances than those of the second gradation characteristic (i=0) in the gradation range from the minimum gradation value (50) to the maximum gradation value (200). In the JND suppressor, the degree of increase in the JND correspondence value can be changed continuously. FIG. 23 shows examples in which the degree of reduction is 0, −20, −40, −60, −80, or −100%. In FIG. 23, 0% represents the second gradation characteristic obtained by performing the maximum shift toward the high gradation value-side (see FIG. 9), and −100% represents the second gradation characteristic obtained by performing the maximum shift toward the high gradation value-side and then performing the JND suppressor with the maximum degree of reduction (i=−100%). In the present embodiment, the gradation characteristic that is yet to be subjected to the maximum shift toward the high gradation value-side corresponds to the first gradation characteristic. The JND suppressor calculation process will be described below.

In the present embodiment, the JND correspondence values j_Pn are calculated using Formula 9 below.

$$j\_Pn = ((j(Lmax) - j(Lmin))/255 + \\ (1 - (j(Lmax) - j(Lmin))/255)*(i/imin))* \\ (Pn - Phmin) + j(Lmin) \quad \text{[Formula 9]}$$

(Pn represents an integer in the gradation range from Phmin to Phmax.)

More specifically, the JND correspondence values j_Pn corresponding to the gradation values Pn are calculated in the gradation range from the minimum gradation value (50) to the maximum gradation value (200) using Formula 9. At this time, the differences between the JND correspondence values corresponding to each gradation value are reduced, and the reduced differences become constant. FIG. 23 is a graph obtained by plotting the calculated JND correspondence values j_Pn. In the present embodiment, a luminance corresponding to a predetermined gradation value [minimum gradation value (50)] is used as a reference, and luminances corresponding to the gradation values other than the predetermined gradation value are set such that the differences between the JND correspondence values corresponding to each gradation value are reduced and the reduced differences become constant.

Figure 24:
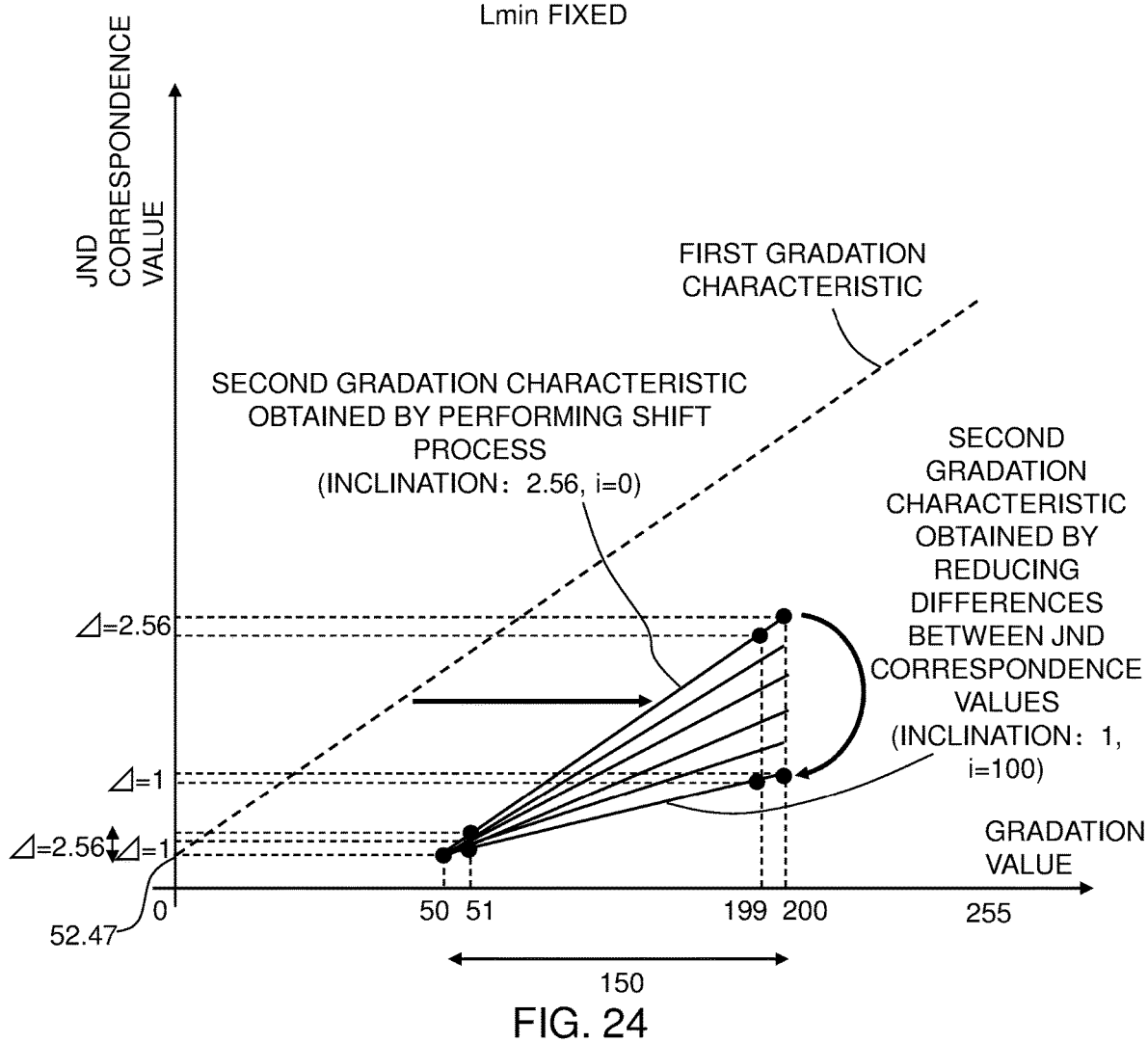
FIG. 24 is a schematic diagram showing the relationship between the gradation value and JND correspondence value obtained by performing the JND suppressor [(6) Lmin is fixed].

At this time, as shown in FIG. 24, the relationship between the gradation value and JND correspondence value varies among the examples of i=0 to −100 continuously or discontinuously. This is a process of shifting the original gradation characteristic to Lmin toward the low luminance-side (the above maximum shift) and then changing the inclination of the graph with the minimum JND correspondence value corresponding to Lmin fixed. For example, as shown in FIG. 24, the JND correspondence value of i=−100 is lower than that of i=0 in a higher gradation range than the minimum gradation value (50). In other words, the luminance of i=−100 is lower than that of i=0 in the higher gradation range than the minimum gradation value (50) (see FIGS. 4 and 23).

Also, by continuously changing i from 0 to −100, the differences between the JND correspondence values corresponding to each gradation value are continuously changed from 2.56 (i=0) to 1 (i=−100). For example, if the operation unit 3 is a mouse, the user may continuously reduce the value of i by sliding the mouse downward. At this time, the resolution of the differences between the JND correspondence values becomes 0.0156 [=(2.56−1)/100]. The indicator 14 may be configured to indicate the value of i (e.g., i=−20) and then to further indicate a predetermined value (e.g., i=−40).

This process corresponds to S3 in FIG. 7. S1, S2, S4, and S5 are similar to those of the JND maximizer and therefore will not be described.

As seen above, in the present embodiment, the differences between the JND correspondence values corresponding to each gradation value can be reduced continuously or discontinuously with the minimum display luminance kept fixed.

11. JND Enhancer (7)-1 Luminance corresponding to specified gradation is fixed (Lmax-side ΔJND<Lmin-side ΔJND) (difference change process)

Figure 25:
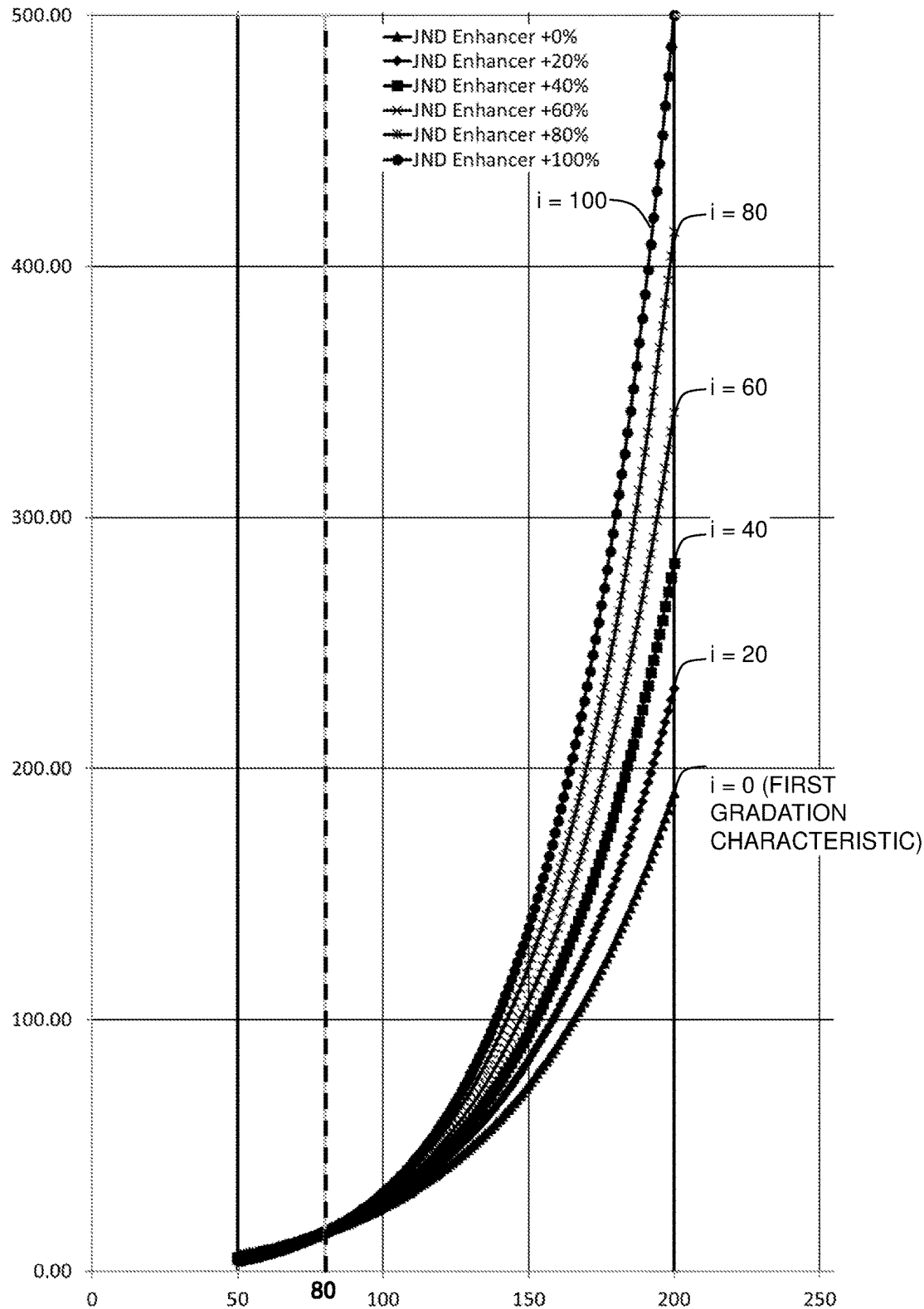
FIG. 25 is a graph showing gradation characteristics obtained by increasing the differences between the JND correspondence values corresponding to each gradation value by the JND enhancer [(7)-1 luminance corresponding to specified gradation is fixed (Lmax-side ΔJND<Lmin-side ΔJND)].

The JND enhancer with a luminance corresponding to a specified gradation value Pc fixed will be described with reference to FIGS. 25 and 26. This is a process of performing the JND enhancer with a luminance corresponding to a gradation value Pc specified by the operation unit 3 fixed. The specified gradation value Pc may be the minimum gradation value (50), the maximum gradation value (200), an intermediate gradation value (125), the average gradation value of the input image data, the median gradation value of the area of interest, the average gradation value of the area of interest, or any gradation value specified by the user. In the present embodiment, a case in which the specified gradation value Pc is 80 will be described.

A problem here is whether the luminance is saturated on the Lmax-side or on the Lmin-side by the specified gradation value Pc. For example, when the specified gradation value Pc is small and when the differences between the JND correspondence values corresponding to each gradation value are increased, sufficient luminance is not assigned to the Lmin-side gradation values. On the other hand, when the specified gradation value Pc is large and when the differences between the JND correspondence values corresponding to each gradation value are increased, sufficient luminance is not assigned to the Lmax-side gradation values. To solve this problem, in the present embodiment, it is determined whether the luminance is saturated on the Lmax-side or on the Lmin-side, using Formula 10 below. A switch is made between the formulas for calculating the JND correspondence values j_Pn corresponding to the gradation values Pn, in accordance with this determination.

$$Lmax\text{-side } \Delta JND = (j(Lmax) - j(L\_Pc))/(Phmax - Pc)$$

$$Lmax\text{-side } \Delta JND = (j(L\_Pmin) - j(Lmin))/(Pc - Phmin) \quad \text{[Formula 10]}$$

This is a process of obtaining the differences ΔJND between the JND correspondence values corresponding to each of the gradation values on the Lmax side or on the Lmin side by dividing the differences between the JND correspondence values by the absolute value of the gradation value from the specified gradation value Pc to the maximum gradation value Phmax or minimum gradation value Phmin. For the relationship between the gradation value and JND correspondence value, see FIG. 12.

When the specified gradation value Pc is 80, the Lmin-side ΔJND is greater than the Lmax-side ΔJND, in other words, the luminance is saturated on the Lmax-side. For this reason, the JND correspondence values j_Pn corresponding to the gradation values Pn are calculated on the basis of Formula 11 below.

$$j\_Pn = ((j(Lmax) - j(L\_Pc))/(Phmax - Pc) - \quad \text{[Formula 11]}$$
$$(j(Lmax) - j(Lmin))/255)*(i/imax) +$$
$$(j(Lmax) - j(Lmin))/255)*(Pn - Pc) + j(L\_Pc)$$

(Pn represents an integer in the gradation range from Phmin to Phmax.)

More specifically, the JND correspondence values j_Pn corresponding to the gradation values Pn are calculated in the gradation range from the minimum gradation value (50) to the maximum gradation value (200) using Formula 11. At this time, the differences between the JND correspondence values corresponding to each gradation value are increased, and the increased differences become constant. FIG. 25 is a graph obtained by plotting the calculated JND correspondence values j_Pn. In the present embodiment, a luminance corresponding to a predetermined gradation value [the specified gradation value Pc (80)] is used as a reference, and luminances corresponding to the gradation values other than the predetermined gradation value are set such that the differences between the JND correspondence values corresponding to each gradation value are increased and the increased differences become constant.

Figure 26:
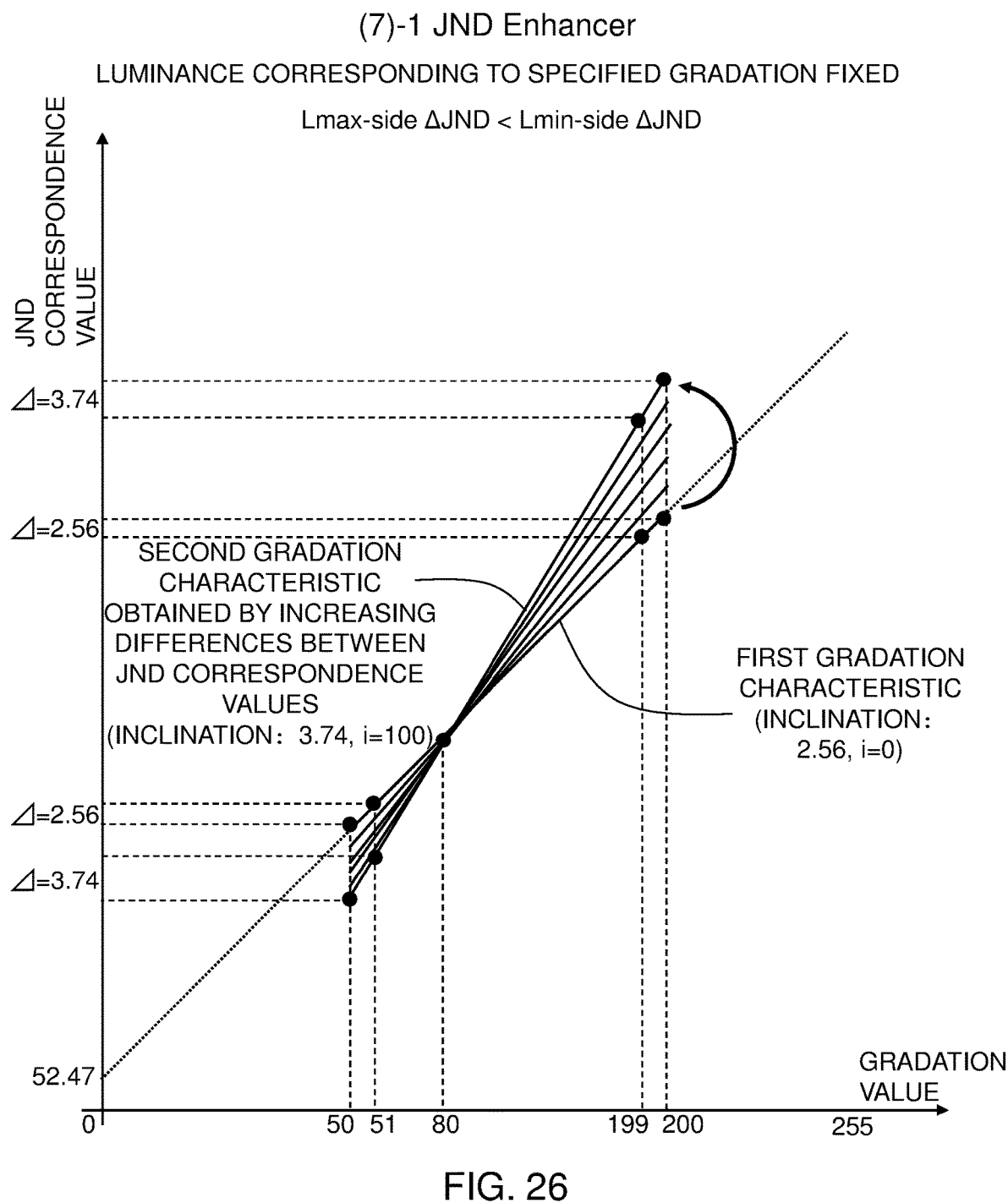
FIG. 26 is a schematic diagram showing the relationship between the gradation value and JND correspondence value obtained by performing the JND enhancer [(7)-1 luminance corresponding to specified gradation is fixed (Lmax-side ΔJND<Lmin-side ΔJND)].

At this time, as shown in FIG. 26, the relationship between the gradation value and JND correspondence value varies among examples of i=0 to 100 continuously or discontinuously. This is a process of changing the inclination of the graph with a JND correspondence value corresponding to the specified gradation value Pc (80) fixed. For example, as shown in FIG. 26, the JND correspondence value of i=100 is higher than that of i=0 in a higher gradation range than the specified gradation value Pc (80). In other words, the luminance of i=100 is higher than that of i=0 in the higher gradation range than the specified gradation value Pc (80) (see FIGS. 4 and 25). On the other hand, the JND correspondence value of i=100 is lower than that of i=0 in a lower gradation range than the specified gradation value Pc (80). In other words, the luminance of i=100 is lower than that of i=0 in the lower gradation range than the specified gradation value Pc (80) (see FIGS. 4 and 25).

Also, by continuously changing i from 0 to 100, the differences between the JND correspondence values corresponding to each gradation value are continuously changed from 2.56 (i=0) to 3.74 (i=100). For example, if the operation unit 3 is a mouse, the user may continuously increase the value of i by sliding the mouse upward. At this time, the resolution of the differences between the JND correspondence values becomes 0.0118 [=(3.74−2.56)/100]. The indicator 14 may be configured to indicate the value of i (e.g., i=20) and then to further indicate a predetermined value (e.g., i=40).

This process corresponds to S3 in FIG. 7. S1, S2, S4, and S5 are similar to those of the JND maximizer and therefore will not be described.

As seen above, in the present embodiment, the differences between the JND correspondence values corresponding to each gradation value can be continuously increased with the luminance corresponding to the specified display gradation value Pc kept fixed.

12. JND Enhancer (7)-2 Luminance corresponding to specified gradation is fixed (Lmin-side ΔJND<Lmax-side ΔJND) (difference change process)

Figure 27:
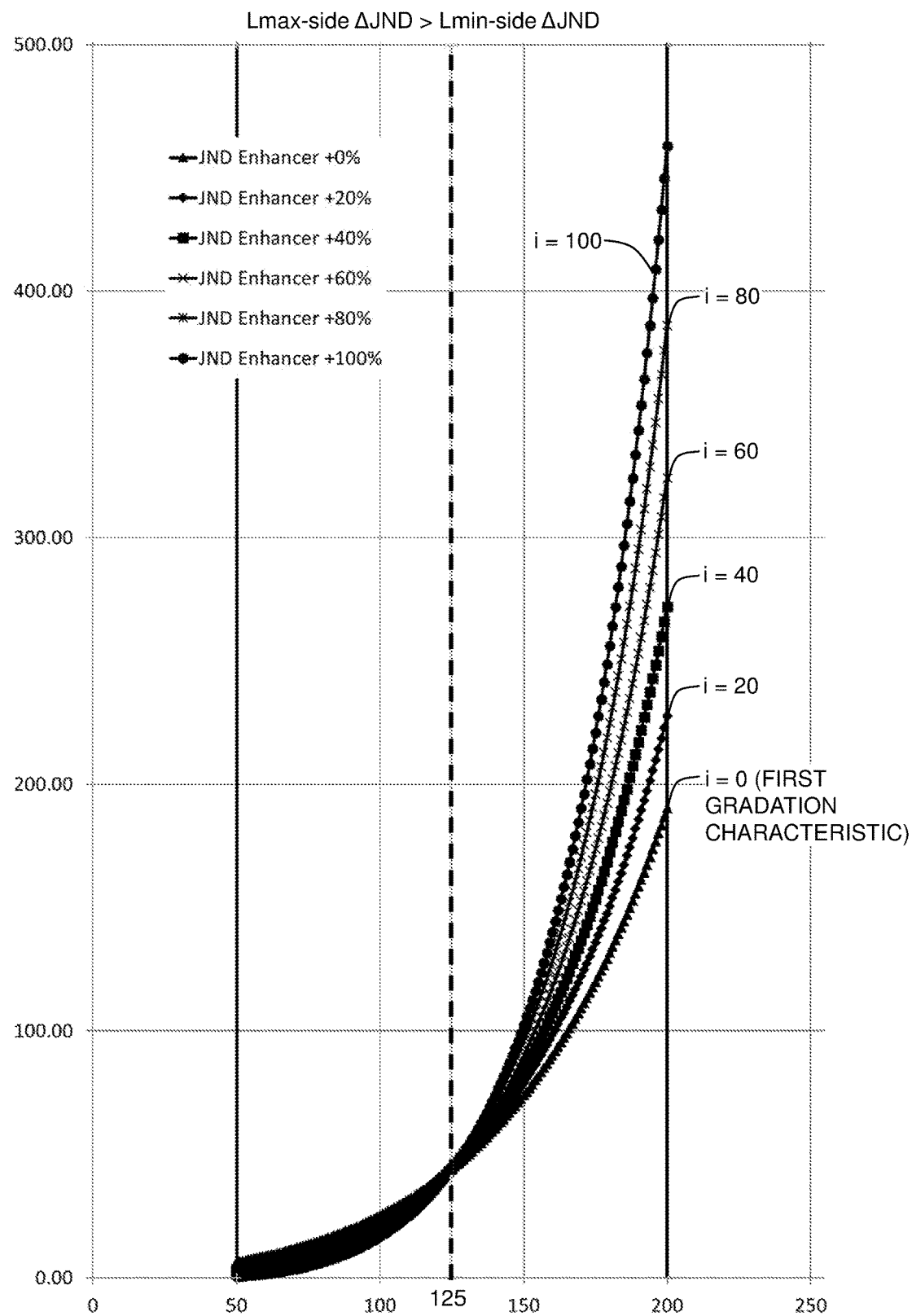
FIG. 27 is a graph showing gradation characteristics obtained by increasing the differences between the JND correspondence values corresponding to each gradation value by the JND enhancer [(7)-2 luminance corresponding to specified gradation is fixed (Lmin-side ΔJND<Lmax-side ΔJND)].

Next, the JND enhancer in a case in which the luminance is saturated on the Lmin-side will be described with reference to FIGS. 27 and 28. In the present embodiment, a case in which the specified gradation value Pc is 125 will be described.

When the specified gradation value Pc is 125, the Lmin-side ΔJND is smaller than the Lmax-side ΔJND, in other words, the luminance is saturated on the Lmin side. For this reason, the JND correspondence values j_Pn corresponding to the gradation values Pn are calculated on the basis of Formula 12 below.

$$j\_Pn = (j(L\_Pc) - (j(Lmin))/(Pc - Phmin) - \quad \text{[Formula 12]}$$
$$(j(Lmax) - j(Lmin))/255)*(i/imax) +$$
$$(j(Lmax) - j(Lmin))/255)*(Pn - Pc) + j(L\_Pc)$$

(Pn represents an integer in the gradation range from Phmin to Phmax.)

More specifically, the JND correspondence values j_Pn corresponding to the gradation values Pn are calculated in the gradation range from the minimum gradation value (50) to the maximum gradation value (200) using Formula 12. At this time, the differences between the JND correspondence values corresponding to each gradation value are increased and the increased differences become constant. FIG. 27 is a graph obtained by plotting the calculated JND correspondence values j_Pn. In the present embodiment, a luminance corresponding to a predetermined gradation value [the specified gradation value Pc (125)] is used as a reference, and luminances corresponding to the gradation values other than the predetermined gradation value are set such that the differences between the JND correspondence values corresponding to each gradation value are increased and the increased differences become constant.

Figure 28:
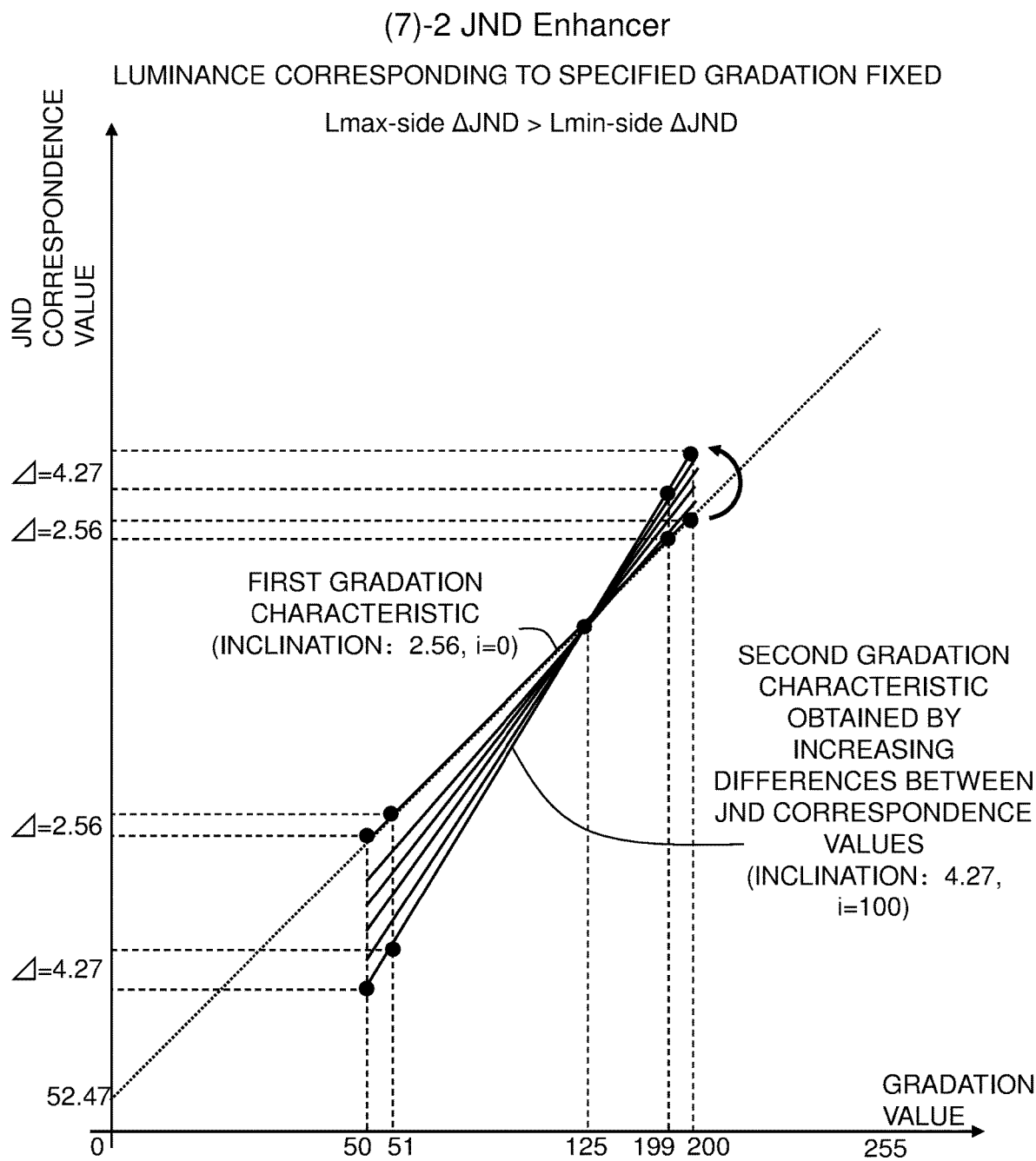
FIG. 28 is a schematic diagram showing the relationship between the gradation value and JND correspondence value obtained by performing the JND enhancer [(7)-2 luminance corresponding to specified gradation is fixed (Lmin-side ΔJND<Lmax-side ΔJND)].

At this time, as shown in FIG. 28, the relationship between the gradation value and JND correspondence value varies among examples of i=0 to 100 continuously or discontinuously. This is a process of changing the inclination of the graph with a JND correspondence value corresponding to the specified gradation value Pc (125) fixed. For example, as shown in FIG. 28, the JND correspondence value of i=100 is higher than that of i=0 in a higher gradation range than the specified gradation value Pc (125). In other words, the luminance of i=100 is lower than that of i=0 in the higher gradation range than the specified gradation value Pc (125) (see FIGS. 4 and 27). On the other hand, the JND correspondence value of i=100 is lower than that of i=0 in a lower gradation range than the specified gradation value Pc (125). In other words, the luminance of i=100 is lower than that of i=0 in the lower gradation range than the specified gradation value Pc (125) (see FIGS. 4 and 27).

Also, by continuously changing i from 0 to 100, the differences between the JND correspondence values corresponding to each gradation value are continuously changed from 2.56 (i=0) to 4.27 (i=100). For example, if the operation unit 3 is a mouse, the user may continuously increase the value of i by sliding the mouse upward. At this time, the resolution of the differences between the JND correspondence values becomes 0.0171 [=(4.27-2.56)/100]. The indicator 14 may be configured to indicate the value of i (e.g., i=20) and then to further indicate a predetermined value (e.g., i=40).

This process corresponds to S3 in FIG. 7. S1, S2, S4, and S5 are similar to those of the JND maximizer and therefore will not be described.

As seen above, in the present embodiment, the differences between the JND correspondence values corresponding to each gradation value can be continuously increased with the luminance corresponding to the specified display gradation value Pc kept fixed.

13. JND Suppressor (8) Luminance corresponding to specified gradation is fixed (difference change process)

Figure 29:
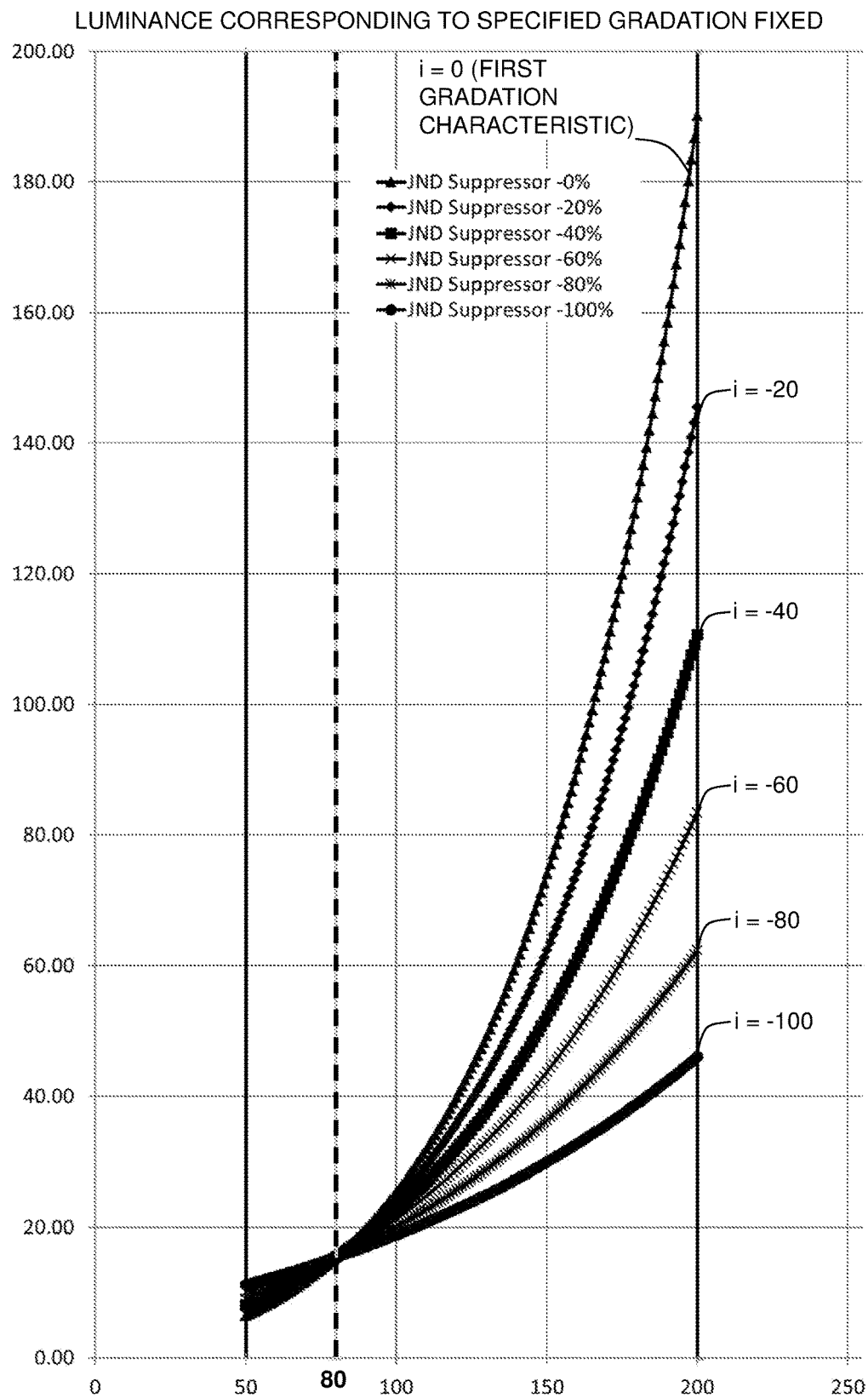
FIG. 29 is a graph showing gradation characteristics obtained by reducing the differences between the JND correspondence values corresponding to each gradation value by the JND suppressor [(8) luminance corresponding to specified gradation is fixed].

The JND suppressor with a luminance corresponding to a specified gradation value Pc fixed will be described below with reference to FIGS. 29 and 30. This is a process of performing the JND suppressor with a luminance corresponding to a gradation value Pc specified by the operation unit 3 fixed. In the present embodiment, a case in which the specified gradation value Pc is 80 will be described. Note that unlike the JND enhancer with the specified gradation value Pc fixed, the JND suppressor reduces the differences between the JND correspondence values corresponding to each gradation value and therefore there is no need to consider the saturation of luminance.

In the present embodiment, the JND correspondence values j_Pn are calculated using Formula 13 below.

$$j\_Pn = ((j(Lmax) - j(Lmin))/255 + \\ (1 - (j(Lmax) - j(Lmin))/255) * (i/imin)) * \\ (Pn - Pc) + j(L\_Pc)$$

[Formula 13]

(Pn represents an integer in the gradation range from Phmin to Phmax.)

More specifically, the JND correspondence values j_Pn corresponding to the gradation values Pn are calculated in the gradation range from the minimum gradation value (50) to the maximum gradation value (200) using Formula 13. At this time, the differences between the JND correspondence values corresponding to each gradation value are reduced and the reduced differences become constant. FIG. 29 is a graph obtained by plotting the calculated JND correspondence values j_Pn. In the present embodiment, a luminance corresponding to a predetermined gradation value [the specified gradation value Pc (80)] is used as a reference, and luminances corresponding to the gradation values other than the predetermined gradation value are set such that the differences between the JND correspondence values corresponding to each gradation value are reduced and the reduced differences become constant.

Figure 30:
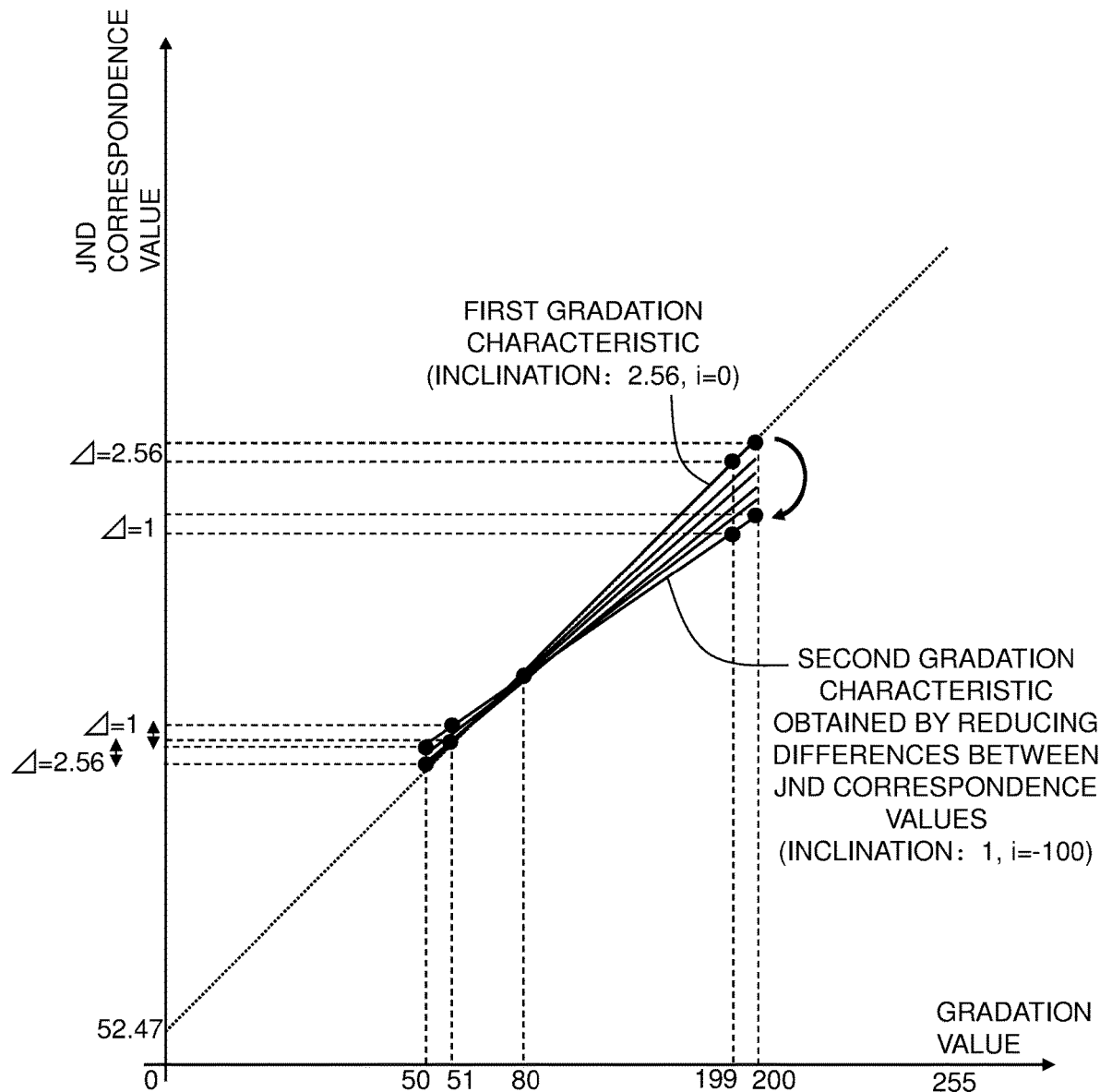
FIG. 30 is a schematic diagram showing the relationship between the gradation value and JND correspondence value obtained by performing the JND suppressor [(8) luminance corresponding to specified gradation is fixed].

At this time, as shown in FIG. 30, the relationship between the gradation value and the JND correspondence value varies among examples of i=0 to −100 continuously or discontinuously. This is a process of changing the inclination of the graph with a JND correspondence value corresponding to the specified gradation value Pc (80) fixed. For example, as shown in FIG. 30, the JND correspondence value of i=−100 is lower than that of i=0 in a higher gradation range than the specified gradation value Pc (80). In other words, the luminance of i=−100 is lower than that of i=0 in the higher gradation range than the specified gradation value Pc (80) (see FIGS. 4 and 29). On the other hand, the JND correspondence value of i=−100 is higher than that of i=0 in a lower gradation range than the specified gradation value Pc (80). In other words, the luminance of i=−100 is higher than that of i=0 in the lower gradation range than the specified gradation value Pc (80) (see FIGS. 4 and 29).

Also, by continuously changing i from 0 to −100, the differences between the JND correspondence values corresponding to each gradation value are continuously changed from 2.56 (i=0) to 1 (i=−100). For example, if the operation unit 3 is a mouse, the user may continuously reduce the value of i by sliding the mouse downward. At this time, the resolution of the differences between the JND correspondence values becomes 0.0156 [=(2.56−1)/100]. The indicator 14 may be configured to indicate the value of i (e.g., i=−20) and then to further indicate a predetermined value (e.g., i=−40).

This process corresponds to S3 in FIG. 7. S1, S2, S4, and S5 are similar to those of the JND maximizer and therefore will not be described.

As seen above, in the present embodiment, the differences between the JND correspondence values corresponding to each gradation value can be reduced continuously or discontinuously with the luminance corresponding to the specified display gradation value Pc kept fixed.

14. Controlling Multiple Display Devices 10

Next, a case in which a display system 100 includes multiple display devices 10 will be described with reference to FIG. 31. In the present embodiment, the display system 100 includes a first display device 10A and a second display device 10B. The first display device 10A includes a first display 4A, and the second display device 10B includes a second display 4B. A display controller 1 is connected to the first display device 10A and second display device 10B. The first display 4A and second display 4B are configured to display input image data as an image on the basis of a gradation characteristic converted by a gradation characteristic converter 13. Various aspects will be described.

14-1. Disposing Display Controller 1 in External Display Control Device 1A.

Figure 31A:
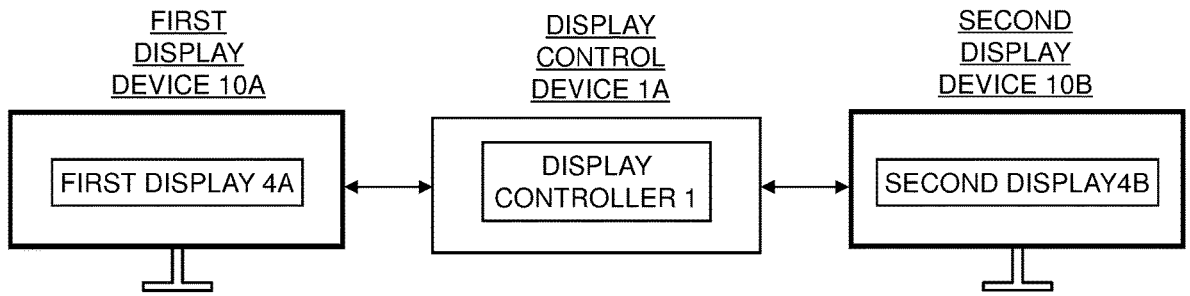
FIG. 31A is a schematic diagram showing an aspect in which a first display device 10A and a second display device 10B are connected through a display controller 1.

As shown in FIG. 31A, a first display device 10A and a second display device 10B are connected to each other by a display controller 1 disposed outside the first display device 10A and second display device 10B. In the present embodiment, the display controller 1 is disposed in an external display control device 1A. A first display 4A and a second display 4B are simultaneously controlled by the display controller 1. Thus, for example, when a past diagnostic image captured under the same conditions is displayed on the first display 4A and the current diagnostic image is displayed on the second display 4B, the user is able to simultaneously control the luminance of the first display 4A and the luminance of the second display 4B by operating the operation unit 3 of the first display device 10A or second display device 10B.

14-2. Disposing Display Controller 1 in Display Control Device 10A

Figure 31B:
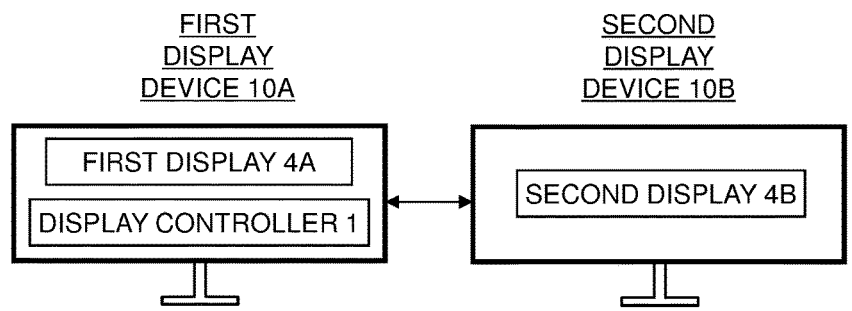
FIG. 31B is a schematic diagram showing an aspect in which a first display device 10A including a display controller 1 and a second display device 10B are connected to each other.

As shown in FIG. 31B, a display controller 1 may be disposed in a first display device 10A. In this case, the display controller 1 is connected to a first display 4A in the first display device 10A and is also connected to a second display 4B. Thus, the first display 4A and second display 4B can be controlled simultaneously.

14-3. Disposing Display Controller 1 in External Storage Unit 2 (Server)

Figure 31C:
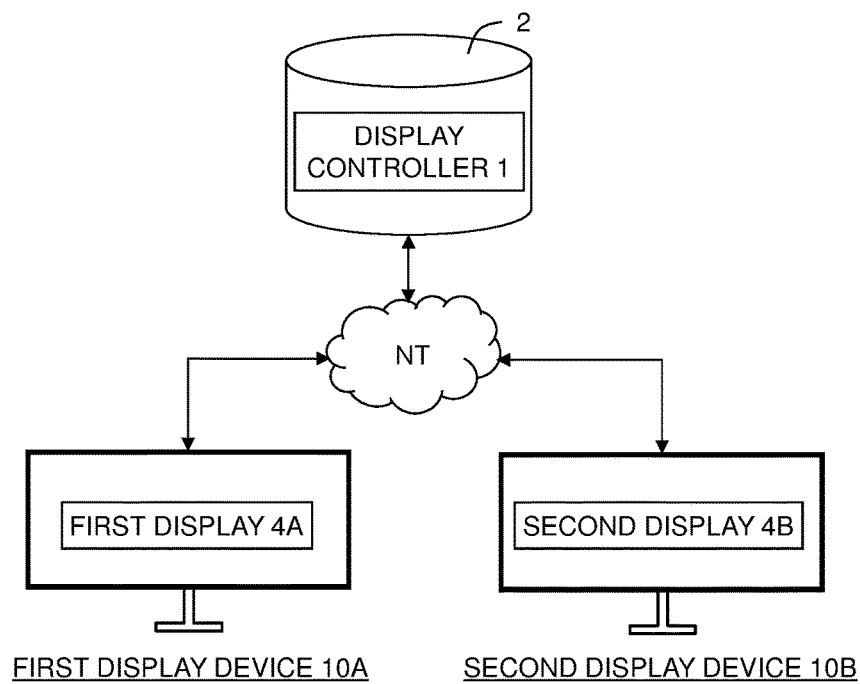
FIG. 31C is a schematic diagram showing an aspect in which a display controller 1 stored in a storage unit 2, a first display device 10A, and a second display device 10B are connected to each other through a network NT.

As shown in FIG. 31C, a display controller 1 may be disposed in an external storage unit 2. The external storage unit 2 is, for example, a server. The display controller 1 is connected to a first display device 10A and a second display device 10B through a network NT. Thus, a first display 4A and a second display 4B can be controlled simultaneously.

As described above, the display systems 100 according to all the above embodiments keep constant the differences between the JND correspondence values corresponding to each gradation value even after the gradation characteristic is changed. Thus, the display systems 100 are able to suppress a reduction in the visibility of an image after the gradation characteristic is changed.

15. Others

While the various embodiments have been described, the present invention is not limited thereto.

For example, the display controller 1 may be provided as an external set-top box of the display device 10. Also, there may be provided an application specific integrated circuit (ASIC), a field-programmable gate array (FPGA), or a dynamic reconfigurable processor (DRP) having the functions of the display controller 1 implemented thereon.

The shift process and difference change process may be performed in any combination. For example, the difference change process may be performed after the shift process is performed, or the shift process may be performed after the difference change process is performed. Also, in the difference change process, the inclination of the graph indicating the relationship between the gradation value and the JND correspondence value (FIG. 12 and the like) may be changed properly without acquiring the minimum gradation value and maximum gradation value of the input image data. Thus, the differences between the JND correspondence values can be increased or reduced. In this aspect, however, it is difficult to favorably control the degree of increase or reduction in the differences between JND correspondence values. For this reason, it is preferred to acquire the minimum gradation value and maximum gradation value of the input image data.

The present invention may be carried out in the following aspect.

A program for causing a computer to function as a gradation characteristic converter, wherein the gradation characteristic converter performs a conversion process of converting a first gradation characteristic into a second gradation characteristic, the first gradation characteristic is a characteristic in which differences between JND correspondence values corresponding to each gradation value are constant, the gradation characteristic converter performs the conversion process such that the differences between the JND correspondence values corresponding to each gradation value defined by the second gradation characteristic become constant, and input image data is displayed on a display as an image with a luminance corresponding to the second gradation characteristic.

The present invention may also be carried out in the following aspect.

The above program, wherein the conversion process includes a shift process of shifting the first gradation characteristic toward a low gradation value-side or a high graduation value-side, and the shift process is performed such that the differences between the JND correspondence values corresponding to each gradation value in the first gradation characteristic and the second gradation characteristic are maintained.

The present invention may also be carried out in the following aspect.

The above program, wherein the conversion process includes a difference change process of increasing or reducing the differences between the JND correspondence values corresponding to each gradation value in the first gradation characteristic.

Also, there may be provided a computer-readable, non-transitory storage medium storing any one of the above programs.

REFERENCE SIGNS LIST

1: display controller
1A: display control device
2: storage unit
3: operation unit
4: display
4A: first display
4B: second display
5: backlight
6: communication unit
7: bus
10: display device
10A: first display device
10B: second display device
11: input image gradation acquisition unit
12: gradation characteristic setter
13: gradation characteristic converter
14: indicator
15: luminance changer
16: gradation characteristic rewriter
17: analyzer
100: display system

The invention claimed is:

1. A display system comprising:
a display;
a display controller,
wherein the display controller further comprises a gradation characteristic converter,
the gradation characteristic converter performs a conversion process of converting a first gradation characteristic into a second gradation characteristic,
the first gradation characteristic is a characteristic in which differences between just-noticeable difference (JND) correspondence values corresponding to each gradation value are constant,
the gradation characteristic converter performs the conversion process such that the differences between the JND correspondence values corresponding to each gradation value defined by the second gradation characteristic become constant, and
the display is configured to display input image data as an image with a luminance corresponding to the second gradation characteristic.

2. The display system of claim 1, wherein the conversion process comprises a shift process of shifting the first gradation characteristic toward a low gradation value-side or a high graduation value-side, and
the shift process is performed such that the differences between the JND correspondence values corresponding to each gradation value in the first gradation characteristic and the second gradation characteristic are maintained.

3. The display system of claim 2, wherein the display controller comprises an indicator configured to indicate the number of graduations shifted in the shift process,
the indicator is configured to be able to continuously change the number of shifted graduations or configured to be able to indicate the number of shifted graduations and then to further indicate the predetermined number of shifted graduations, and
the shift process comprises shifting the first gradation characteristic by the number of shifted graduations indicated by the indicator.

4. The display system of claim 2, wherein the display controller comprises an input image gradation acquisition unit,
the input image gradation acquisition unit is configured to acquire any two gradation values of the input image data, and
the shift process comprises shifting the first gradation characteristic such that the smaller of the two gradation values corresponds to a minimum luminance of the display or the larger of the two gradation values corresponds to a maximum luminance of the display.

5. The display system of claim 4, wherein the two gradation values of the input image data are a minimum gradation value and a maximum gradation value of the input image data.

6. The display system of claim 4, further comprising an operation unit configured to operate the indicator, wherein when one action is performed on the operation unit, the shift process is performed.

7. The display system of claim 1, wherein the conversion process comprises a difference change process of increasing or reducing the differences between the JND correspondence values corresponding to each gradation value in the first gradation characteristic.

8. The display system of claim 7, further comprising an indicator configured to indicate the degree of the increasing or reducing, wherein the indicator is configured to be able to continuously change the degree of the increasing or reducing or configured to be able to indicate the degree of the increasing or reducing and then to further indicate a predetermined value as the degree of the increasing or reducing, and
the difference change process comprises increasing or reducing the differences between the JND correspondence values corresponding to each gradation value in the first gradation characteristic with the degree of the increasing or reducing indicated by the indicator.

9. The display system of claim 7, wherein the display controller comprises an input image gradation acquisition unit,
the input image gradation acquisition unit is configured to acquire any two gradation values of the input image data, and
the difference change process is performed such that a minimum luminance corresponding to the first gradation characteristic is set on the smaller of the two gradation values and a maximum luminance corresponding to the first gradation characteristic is set on the larger of the two gradation values.

10. The display system of claim 9, wherein the two gradation values of the input image data are a minimum gradation value and a maximum gradation value of the input image data.

11. The display system of claim 9, further comprising an operation unit configured to operate the indicator, wherein when one action is performed on the operation unit, the difference change process is performed.

12. The display system of claim 1, further comprising:
a storage unit configured to store the first gradation characteristic; and
a gradation characteristic rewriter configured to, after the conversion process is performed, rewrite the first gradation characteristic stored in the storage unit into the second gradation characteristic.

13. The display system of claim 1, wherein the first gradation characteristic is associated with the standard display function defined by the Digital Imaging and Communications in Medicine (DICOM) standard.

14. The display system of claim 1, further comprising a display device including the display, wherein
the display controller is disposed in the display device.

15. The display system of claim 1, further comprising:
a first display;
a second display,
wherein the display controller is connected to the first display and the second display, and
the first display and the second display are configured to display the input image data as an image with a luminance corresponding to the second gradation characteristic.

16. A computer readable, non-transitory storage medium comprising a program for causing a computer to function as a gradation characteristic converter, wherein
the gradation characteristic converter performs a conversion process of converting a first gradation characteristic into a second gradation characteristic,
the first gradation characteristic is a characteristic in which differences between JND correspondence values corresponding to each gradation value are constant,
the gradation characteristic converter performs the conversion process such that the differences between the JND correspondence values corresponding to each gradation value defined by the second gradation characteristic become constant, and
input image data is displayed on a display as an image with a luminance corresponding to the second gradation characteristic.

17. The computer readable, non-transitory storage medium of claim 16, wherein the conversion process comprises a shift process of shifting the first gradation characteristic toward a low gradation value-side or a high gradation value-side, and
the shift process is performed such that the differences between the JND correspondence values corresponding to each gradation value in the first gradation characteristic and the second gradation characteristic are maintained.

18. The computer readable, non-transitory storage medium of claim 16, wherein the conversion process comprises a difference change process of increasing or reducing the differences between the JND correspondence values corresponding to each gradation value in the first gradation characteristic.

* * * * *